US012576855B2

(12) United States Patent
Chung et al.

(10) Patent No.: US 12,576,855 B2

(45) Date of Patent: Mar. 17, 2026

(54) ELECTRONIC DEVICE AND METHOD FOR UPDATING WEATHER INFORMATION BASED ON ACTIVITY STATE OF USER USING THE SAME

(71) Applicant: Samsung Electronics Co., Ltd., Suwon-si (KR)

(72) Inventors: Jinkyo Chung, Suwon-si (KR); Jiwon Yoo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 153 days.

(21) Appl. No.: 18/331,457

(22) Filed: Jun. 8, 2023

(65) Prior Publication Data

US 2024/0017728 A1 Jan. 18, 2024

Related U.S. Application Data

(63) Continuation of application No. PCT/KR2023/006564, filed on May 15, 2023.

(30) Foreign Application Priority Data

Jul. 18, 2022 (KR) ........................ 10-2022-0087985

(51) Int. Cl.
*B60W 40/08* (2012.01)

(52) U.S. Cl.
CPC ......... *B60W 40/08* (2013.01); *B60W 2300/36* (2013.01); *B60W 2554/4041* (2020.02); *B60W 2555/20* (2020.02)

(58) Field of Classification Search
CPC ......... B60W 40/08; B60W 2554/4041; B60W 2554/20
See application file for complete search history.

(56) References Cited

U.S. PATENT DOCUMENTS 9,516,113 B2  12/2016  Yoo et al.
10,051,107 B1  8/2018  Prasad et al.
(Continued)

FOREIGN PATENT DOCUMENTS

JP   2010-204854   9/2010
KR   10-2009-0002694   1/2009
(Continued)

OTHER PUBLICATIONS

Search Report dated Aug. 17, 2023 in International Patent Application No. PCT/KR2023/006564.
(Continued)

*Primary Examiner* — Andrea C Leggett

(74) *Attorney, Agent, or Firm* — Nixon & Vanderhye, P.C.

(57) ABSTRACT

An example electronic device may include a wireless communication circuit, a positioning circuit, a sensor circuit, a touch screen display, and a processor operatively connected to the wireless communication circuit, the positioning circuit, the sensor circuit, and the touch screen display. The processor may be configured to identify an activity state of a user of the electronic device based on sensor information received for a predetermined time through an external electronic device connected through the wireless communication circuit and the sensor circuit, update the weather information corresponding to position information of the electronic device received through the positioning circuit when an update period of the weather information corresponding to the identified activity state of the user arrives, and display at least one graphic object related to at least one of the position information, the weather information, or the activity state of the user on the touch screen display.

20 Claims, 11 Drawing Sheets

(56)        References Cited

U.S. PATENT DOCUMENTS

| | | | |
|---|---|---|---|
| 11,061,372 B1 * | 7/2021 | Chen | .................... G06F 3/04847 |
| 11,341,529 B2 | 5/2022 | Kim et al. | |
| RE49,367 E * | 1/2023 | Cho | ................. H04M 1/72433 |
| 2006/0035628 A1 * | 2/2006 | Miller | ................... H04M 3/493 |
| | | | 455/414.3 |
| 2011/0119355 A1 | 5/2011 | Hwang | |
| 2018/0285463 A1 | 10/2018 | Choi et al. | |
| 2019/0311401 A1 | 10/2019 | Kim et al. | |
| 2021/0311438 A1 * | 10/2021 | Wilson | .................... G06F 9/451 |
| 2022/0147243 A1 | 5/2022 | Louch | |
| 2022/0342117 A1 * | 10/2022 | Miller | .................... B64D 43/00 |
| 2022/0406308 A1 * | 12/2022 | Yoo | ......................... G10L 15/32 |

FOREIGN PATENT DOCUMENTS

| | | |
|---|---|---|
| KR | 20100050603 A | 5/2010 |
| KR | 10-1511514 | 4/2015 |
| KR | 10-2016-0106510 | 9/2016 |
| KR | 10-2017-0050878 | 5/2017 |
| KR | 10-2018-0033834 | 4/2018 |
| KR | 10-2149779 | 8/2020 |
| KR | 102268453 B1 | 6/2021 |

OTHER PUBLICATIONS

Written Opinion dated Aug. 17, 2023 in International Patent Application No. PCT/KR2023/006564.
Extended Search Report dated May 27, 2025 in European Application No. 23843150.6.

* cited by examiner

FIG. 3

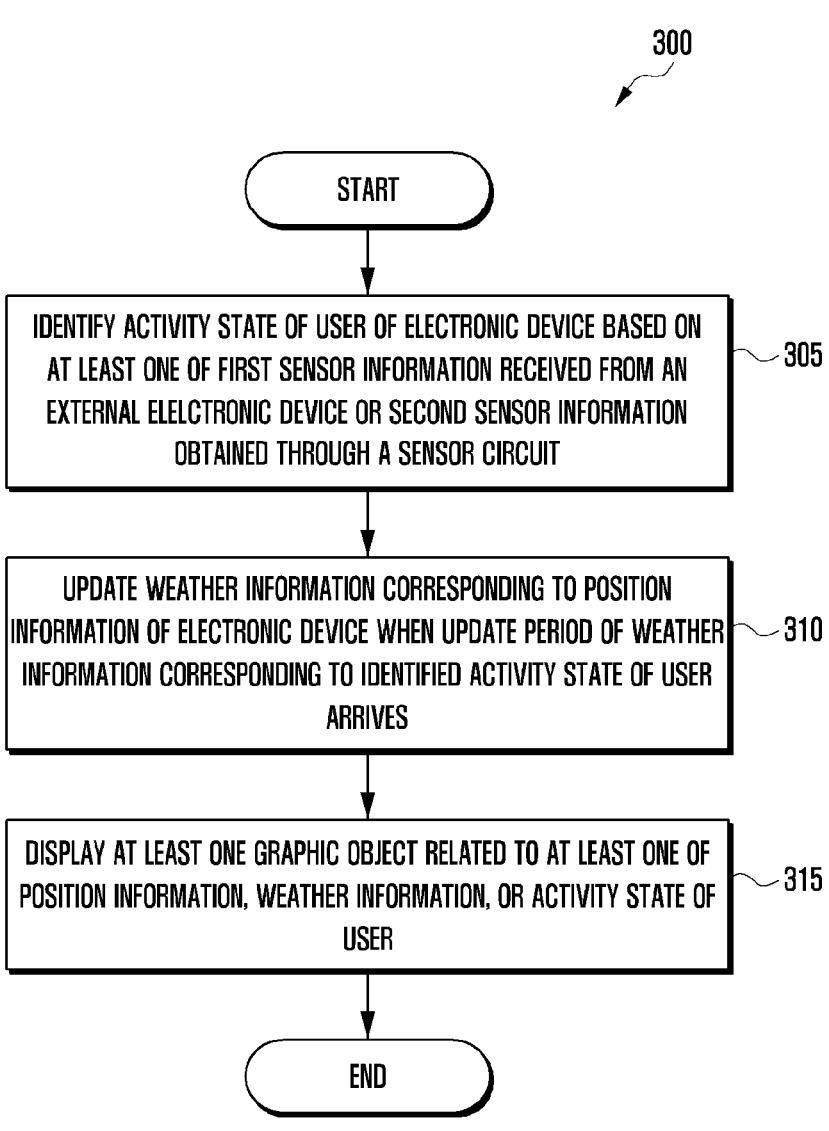

300

START

IDENTIFY ACTIVITY STATE OF USER OF ELECTRONIC DEVICE BASED ON
AT LEAST ONE OF FIRST SENSOR INFORMATION RECEIVED FROM AN
EXTERNAL ELELCTRONIC DEVICE OR SECOND SENSOR INFORMATION
OBTAINED THROUGH A SENSOR CIRCUIT                                    305

UPDATE WEATHER INFORMATION CORRESPONDING TO POSITION
INFORMATION OF ELECTRONIC DEVICE WHEN UPDATE PERIOD OF WEATHER
INFORMATION CORRESPONDING TO IDENTIFIED ACTIVITY STATE OF USER
ARRIVES                                                              310

DISPLAY AT LEAST ONE GRAPHIC OBJECT RELATED TO AT LEAST ONE OF
POSITION INFORMATION, WEATHER INFORMATION, OR ACTIVITY STATE OF
USER                                                                315

END

500

(510)

(550)

ELECTRONIC DEVICE AND METHOD FOR UPDATING WEATHER INFORMATION BASED ON ACTIVITY STATE OF USER USING THE SAME

CROSS-REFERENCE TO RELATED APPLICATIONS

This application is a continuation of International Application No. PCT/KR2023/006564 designating the United States, filed May 15, 2023, and claiming priority to Korean Patent Application No. 10-2022-0087985, filed on Jul. 18, 2022, in the Korean Intellectual Property Office. The entire disclosures of each of these applications are incorporated herein by reference for all purposes.

BACKGROUND

Field

The disclosure relates to an electronic device and method for updating weather information based on an activity state of a user using the same.

Description of Related Art

An electronic device may execute a variety of applications. The electronic device may provide application functions frequently used by a user in the form of a widget as a method for the user to conveniently use and manage the applications. For example, the electronic device may display application information provided in the form of a widget on a lock screen and/or a home screen so that the user can easily access the application information. The application information provided in the form of a widget may be automatically updated at a period of time configured by the user or at a period of time configured by default in the electronic device, or may be manually updated based on a user input.

SUMMARY

As application information provided in the form of a widget is automatically updated at a predetermined period of time or manually updated based on a user input, it may not be possible to provide application information based on a user's current state.

An electronic device according to various embodiments of the disclosure may identify an activity state of a user based on sensor information related to motion of the electronic device and may update the application information when a period of updating the application information corresponding to the identified activity state of the user arrives.

An electronic device according to various embodiments of the disclosure may include a wireless communication circuit, a positioning circuit, a sensor circuit, a touch screen display, and a processor operatively connected to the wireless communication circuit, the positioning circuit, the sensor circuit, and the touch screen display, and the processor may be configured to identify an activity state of a user of the electronic device based on at least one of first sensor information received from an external electronic device or second sensor information obtained through the sensor circuit, update the weather information corresponding to position information of the electronic device received through the positioning circuit when an update period of the weather information corresponding to the identified activity state of the user arrives, and display at least one graphic object related to at least one of the position information, the weather information, or the activity state of the user on the touch screen display.

A method for updating weather information based on an activity state of a user according to various embodiments of the disclosure may include identifying the activity state of the user based on at least one of first sensor information received from an external electronic device or second sensor information obtained through a sensor circuit, updating the weather information corresponding to position information of the electronic device when an update period of the weather information corresponding to the identified activity state of the user arrives, and displaying at least one graphic object related to at least one of the position information, the weather information, or the activity state of the user on a touch screen display.

An electronic device according to various embodiments of the disclosure updates application information (e.g., a weather application) according to an update period corresponding to an activity state of a user, thereby providing information about an application suitable for a current activity state of a user in real time.

BRIEF DESCRIPTION OF THE DRAWINGS

The above and/or other aspects of the disclosure will be more apparent by describing certain embodiments of the disclosure with reference to the accompanying drawings, in which:

FIG. 3 is a flowchart illustrating an example method for updating weather information based on an activity state of a user according to various embodiments;

DETAILED DESCRIPTION

Figure 1:
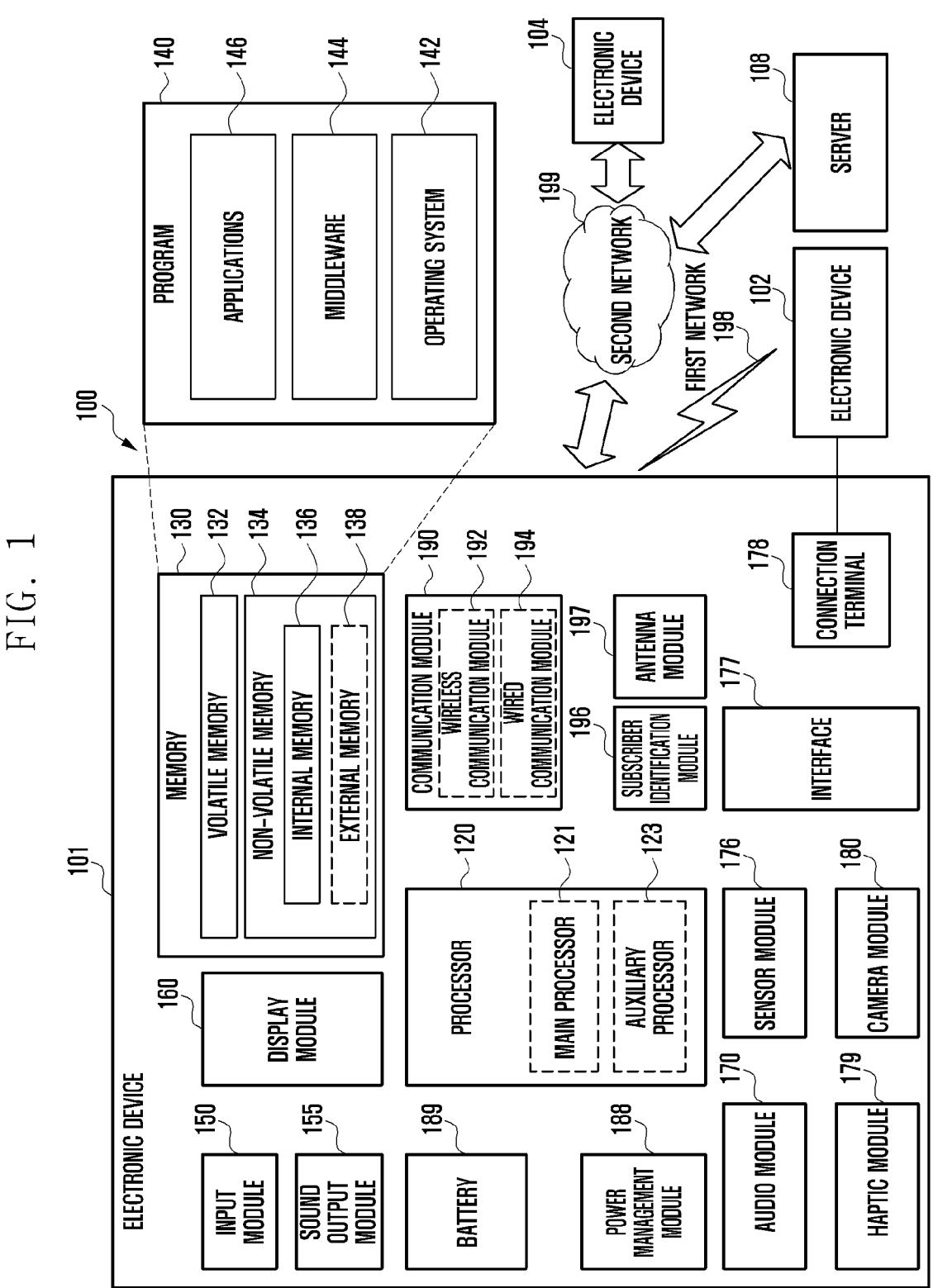
FIG. 1 is a block diagram illustrating an example electronic device in a network environment according to various embodiments.

FIG. 1 is a block diagram illustrating an example electronic device 101 in a network environment 100 according to various embodiments.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In various embodiments, at least one of the components (e.g., the connection terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121, while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof, but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 and/or an external memory 138.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of, the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) (e.g., speaker or headphone) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., through wires) or wirelessly. According to an embodiment, the interface 177 may include, for example, a high-definition multimedia interface (HDMI), a universal serial bus (USB) interface, a secure digital (SD) card interface, or an audio interface.

The connection terminal 178 may include a connector via which the electronic device 101 may be physically connected with the external electronic device (e.g., the electronic device 102). According to an embodiment, the connection terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his/her tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., an application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wi-Fi direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large-scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of or including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., an mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and do not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), the element may be coupled with the other element directly (e.g., through wires), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium, where the term "non-transitory" refers to the storage medium being a tangible device, and does not include a signal (e.g., an electromagnetic wave), but this term does not differentiate between data being semi-permanently stored in the storage medium and data being temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
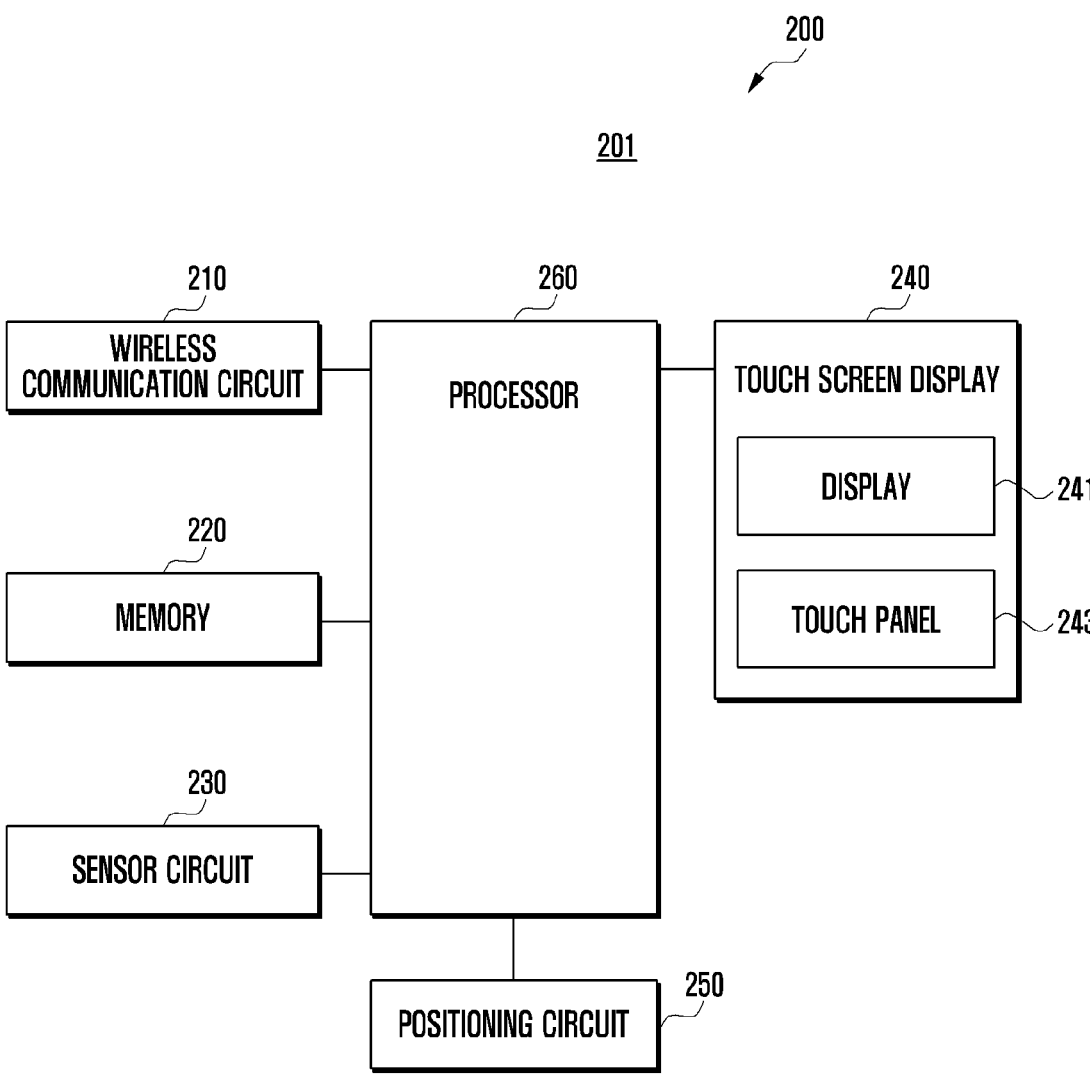
FIG. 2 is a block diagram illustrating an example electronic device according to various embodiments.

FIG. 2 is a block diagram 200 illustrating an example electronic device 201 according to various embodiments.

With reference to FIG. 2, an electronic device 201 (e.g., the electronic device 101 in FIG. 1) may include a wireless communication circuit 210 (e.g., the communication module 190 in FIG. 1), a memory 220 (e.g., the memory 130 in FIG. 1), a sensor circuit 230 (e.g., the sensor module 176 in FIG. 1), a touch screen display 240 (e.g., the display module 160 in FIG. 1), a positioning circuit (250), and/or a processor 260 (e.g., the processor 120 in FIG. 1).

According to various embodiments, the wireless communication circuit 210 (e.g., the communication module 190 in FIG. 1) may control the communication connection between the electronic device 201 and at least one external electronic device (e.g., the electronic device 102, the electronic device 104) (and/or a server (e.g., the server 108 in FIG. 1)).

In various embodiments, the memory 220 (e.g., the memory 130 in FIG. 1) may perform a function of storing a program (e.g., the program 140 in FIG. 1) for processing and controlling the processor 260 of the electronic device 201, an operating system (OS) (e.g., the operating system 142 in FIG. 1), various applications, and/or input/output data, and may store programs for controlling the overall operation of the electronic device 201. The memory 220 may store various configuration information necessary for the electronic device 201 to process functions related to various embodiments of the disclosure.

In an embodiment, the memory 220 may store instructions for obtaining sensor information related to the motion of the electronic device 201 using at least one sensor (e.g., at least one of a motion sensor, a geomagnetic sensor, an acceleration sensor, or a gyro sensor) included in the sensor circuit 230. The memory 220 may store instructions for determining an activity state of the user based on information related to the motion of the electronic device 201. The memory 220 may store instructions for configuring (or setting) an update period of weather information corresponding to the activity state of the user. The memory 220 may store instructions for determining and displaying graphic objects (e.g., text, images, and/or animated images) representing weather information corresponding to the location information and/or position information of the electronic device 201. The memory 220 may store instructions for determining and displaying a graphic object (e.g., an image and/or an animation image) representing an activity state of the user, based on a degree of confidence of an activity state of the user.

In an embodiment, the memory 220 may accumulate and store the activity state of the user and sensor information corresponding to the activity state of the user (e.g., biometric information, health information, and/or sensor information related to the motion of the electronic device 201) under the control of the processor 260.

In an embodiment, the memory 220 may store a graphic object database (DB) in which at least one graphic object that may be provided as weather information (e.g., a weather widget) is stored. For example, the graphic object DB may include a first graphic object DB including at least one first graphic object related to the activity state of the user (e.g., walking, running, on a bicycle, in a vehicle), a second graphic object DB including at least one second graphic object related to the position information of the electronic device 201 (e.g., mountains, seas, cities, countryside, houses, and offices), and/or a third graphic object DB including at least one third graphic object related to weather information (e.g., clear, cloudy, rain, strong winds, hail, snow).

In various embodiments, the sensor circuit 230 (e.g., the sensor module 176 in FIG. 1) may measure a physical quantity or detect a state of the electronic device 201 and generate a corresponding electrical signal or data value.

In various embodiments, the sensor circuit 230 may include a motion sensor and/or a 9-axis sensor (e.g., a geomagnetic sensor, an acceleration sensor and/or a gyro sensor). For example, the acceleration sensor may measure acceleration acting on three axes (e.g., x-axis, y-axis, and z-axis) and may measure, estimate, and/or detect the force being applied to the electronic device 201, using the measured acceleration. In a case that the motion of the electronic device 201 is not detected, the acceleration sensor may output a value corresponding to the gravitational acceleration. In a ease that the motion of the electronic device 201 is detected, the acceleration sensor may output an amount of change in force based on vibration caused by the motion of the electronic device 201, i.e., the amount of change in acceleration. The gyro sensor may be located inside the electronic device 201 and configured to measure rotation related to the electronic device 201. The gyro sensor may be configured to measure rotation on three axes (e.g., x-axis, y-axis, and z-axis). The geomagnetic sensor may measure the geomagnetic vector for three axes (e.g., x-axis, y-axis, and z-axis) and may measure the azimuth using the magnitude and direction of the geomagnetic vector. The acceleration sensor, the gyro sensor, and the geomagnetic sensor may be integrated into one sensor (e.g., a 9-axis sensor) and implemented. The sensor circuit 230 (e.g., a motion sensor, an acceleration sensor, a geomagnetic sensor, and/or a gyro sensor) may obtain the sensor information related to the motion of the electronic device 201 (e.g., movement speed information, movement direction information, movement distance information of the electronic device 201, and/or tilt information of the electronic device 201). The sensor circuit 230 may transmit the acquired sensor information related to the motion of the electronic device 201 to the processor 260.

In an embodiment, the sensor circuit 230 is not limited thereto and may further include a biosensor. The biometric sensor may detect a user's state, obtain vital signal data corresponding to the detected activity state of the user, and transmit the obtained vital signal data to the processor 260. In an embodiment, the processor 260 may identify (or determine) the activity state of the user by further using the vital signal data acquired from the biometric sensor. For example, the biosensor may include at least one of a heart rate monitor (HRM) sensor, an electrocardiogram (ECG) sensor, and a saturation of percutaneous oxygen (SpO2) sensor.

In various embodiments, the touch screen display 240 (e.g., the display module 160 in FIG. 1) may be integrally configured including the display 241 and the touch panel 243.

In an embodiment, the touch screen display 240 displays an image under the control of the processor 260, and may be implemented as one of a liquid crystal display (LCD), a light-emitting diode (LED) display, a micro LED (μLED)

display, an organic light-emitting diode (OLED) display, an active matrix organic light-emitting diode (AMOLED) display, a micro electro mechanical systems (MEMS) display, an electronic paper display, and a flexible display, but is not limited thereto. In an embodiment, the touch panel 243 may be an integrated touch panel including a hand touch panel that senses a hand gesture and a pen touch panel that senses a pen gesture.

In an embodiment, the touch screen display 240 may display updated weather information according to an update period corresponding to the activity state of the user under the control of the processor 260. The touch screen display 240 may display a graphic object representing at least one of the activity state of the user, the position information of the electronic device 201, and weather corresponding to the position information as the updated weather information under the control of the processor 260.

In various embodiments, the positioning circuit 250 may measure the current position of the electronic device 201. For example, the positioning circuit 250 may include a global positioning system (GPS) circuit and/or a global navigation satellite system (GNSS) circuit. The GPS circuit may receive signals output from one or more satellites and determine the position of the electronic device 201 based on information included in the signals (e.g., signal transmission time, satellite position information). The GNSS circuit may transmit current position information (e.g., coordinate information including latitude and longitude) of the electronic device 201 to the processor 260.

In various embodiments, the processor 260 may include, for example, a micro controller unit (MCU), and operate an operating system (OS) or an embedded software program to control a number of hardware components connected to the processor 260. The processor 260 may control a plurality of hardware components according to, for example, instructions (e.g., the program 140 in FIG. 1) stored in the memory 220.

In an embodiment, the processor 260 may receive sensor information for a predetermined time using an external electronic device and/or the sensor circuit 230 (e.g., at least one of a motion sensor, a geomagnetic sensor, an acceleration sensor, and a gyro sensor). For example, the sensor information received from an external electronic device may include biometric information and/or health information. The sensor information received through the sensor circuit 230 may be sensor information related to the motion of the electronic device 201. For example, the sensor information related to the motion of the electronic device 201 may include at least one of a moving speed of the electronic device 201, a degree of tilting of the electronic device 201, and a distance the electronic device 201 moved for a predetermined time, but is not limited thereto.

In an embodiment, the processor 260 may identify the activity state of the user based on the sensor information. For example, the activity state of the user may include a first state, a second state, and/or a third state. The first state of the user may be a state in which the user equipped with the electronic device 201 is moving in a vehicle. The second state of the user may be a state in which the user equipped with the electronic device 201 is moving on a bicycle. The third state of the user may be a state in which the user equipped with the electronic device 201 is running or walking. However, the states are not limited thereto.

In an embodiment, the processor 260 may determine an update period of weather information corresponding to the activity state of the user. For example, when the activity state of the user is identified as the first state (e.g., a state in which the user equipped with the electronic device 201 is moving in a vehicle), the processor 260 may determine the update period of weather information as a first period of time. When the activity state of the user is identified as the second state (e.g., a state in which the user equipped with the electronic device 201 is moving on a bicycle), the processor 260 may determine the update period of weather information as a second time period. The second period of time may be longer than the first period of time. When the activity state of the user is identified as the third state (e.g., the user with the electronic device 201 is running or walking), the processor 260 may determine the update period of the weather information as a third period of time. The third period of time may be longer than the second period of time.

In an embodiment, when the update period (e.g., the first period of time, the second period of time, and/or the third period of time) arrives, the processor 260 may update the weather information corresponding to the location information and/or position information of the electronic device 201.

In an embodiment, the processor 260 may determine whether confidence related to the activity state of the user exceeds a predetermined value. The confidence related to the activity state of the user may be related to the accuracy of the activity state of the user (e.g., the first state, the second state, and/or the third state). In a case that the confidence related with the activity state of the user exceeds a predetermined value, the processor 260 may receive weather information corresponding to the position information of the electronic device 201 based on an update period corresponding to the activity state of the user. The processor 260 may determine a graphic object (e.g., text, image, and/or animated image) related to the activity state of the user, and may display at least graphic objects (e.g., text, images, and/or animated images) related to at least one of updated position information, weather information, or the activity state of the user. In a case that the confidence related to the activity state of the user does not exceed a predetermined value, the processor 260 may update the weather information corresponding to the location information and/or position information of the electronic device 201 based on the update period corresponding to the activity state of the user, and may display a graphic object related to the updated position information and/or weather information.

In an embodiment, after updating the weather information, when it is identified that the activity state of the user is changed based on the sensor information received for a predetermined time through the external electronic device and/or the sensor circuit 230, the processor 260 may change the update period of the weather information to a period corresponding to the changed activity state of the user. When it is identified that the changed period has elapsed from the time the weather information was updated (e.g., the last updated time), the processor 260 may update the weather information corresponding to the location information and/or position information of the electronic device 201 and may display a graphic object relate to the updated position information and/or weather information and a graphic object related to the activity state of the user.

The electronic device 201 according to various embodiments includes the wireless communication circuit 210, the positioning circuit 250, the sensor circuit 230, and the touch screen display 240, and the processor 260 operatively connected to the wireless communication circuit 210, the positioning circuit 250, the sensor circuit 230, and the touch screen display 240. The processor 260 may be configured to identify the activity state of the user of the electronic device 201, based on at least one of first sensor information received from an external electronic device connected through the wireless communication circuit 210 or second sensor information obtained through the sensor circuit 230, update the weather information corresponding to the position information of the electronic device 201 received through the positioning circuit 250 when the update period of the weather information corresponding to the identified activity state of the user arrives, and display at least one graphic object related to at least one of the position information, the weather information, or the activity state of the user on the touch screen display 240.

The first sensor information according to various embodiments may include at least one of biometric information or health information.

The second sensor information according to various embodiments may include at least one of the moving speed of the electronic device 201, the degree of tilting of the electronic device 201, or the distance the electronic device 201 moved for a predetermined time.

The activity state of the user according to various embodiments may include the first state, the second state, and/or the third state.

The first state according to various embodiments may be a state in which the user is moving in a vehicle.

The second state according to various embodiments may be a state in which the user is moving on a bicycle.

The third state according to various embodiments may be a state in which the user is running or walking.

In various embodiments, the processor 260 may further identify the activity state of the user based on at least one of external information, additional information, or AP information.

The external information according to various embodiments may include at least one of information about a communication connection state with the vehicle or ambient noise information.

The additional information according to various embodiments may include schedule information.

In various embodiments, when the activity state of the user is identified as the first state, the processor 260 may configure the update period of the weather information to the first period of time; when the activity state of the user is identified as the second state, the processor 260 may configure the update period of the weather information to the second period of time; and, when the activity state of the user is identified as the third state, the processor 260 may configure the update period of the weather information to the third period of time.

The second period of time according to various embodiments may be longer than the first period of time.

The third period of time according to various embodiments may be longer than the second period of time.

In various embodiments, the processor 260 may transmit raw data for the at least one of the first sensor information or the second sensor information to a server through the wireless communication circuit 210, and may receive a learning model learned through machine learning by artificial intelligence from the server to identify the activity state of the user based on the received learning model.

In various embodiments, the processor 260 may transmit raw data for the at least one of the first sensor information or the second sensor information to the server through the wireless communication circuit 210, and may receive the activity state of the user corresponding to the at least one of the first sensor information or the second sensor information related to the motion of the electronic device 201 from the server to identify the activity state of the user based on the received activity state of the user corresponding to the at least one of the first sensor information or the second sensor information.

The electronic device 201 according to various embodiments may further include the memory 220. In various embodiments, the processor 260 may be configured to accumulate and store the identified activity state of the user and the at least one of the first sensor information or the second sensor information corresponding to the identified activity state of the user in the memory 220, learn the activity state of the user and the at least one of the first sensor information or the second sensor information corresponding to the activity state stored in the memory 220 in an artificial intelligence scheme, and calculate confidence related to the activity state of the user based on the learned learning model.

In various embodiments, the processor 260 may be configured to identify whether the calculated confidence related to the activity state of the user exceeds a predetermined value. In a case that the calculated confidence related to the activity state of the user exceeds the predetermined value, the processor 260 may be configured to receive the weather information corresponding to the position information of the electronic device 201 from an external server (e.g., a weather server) when the update period corresponding to the identified activity state of the user arrives, determine a graphic object related to the activity state of the user, and display the determined graphic object related to the activity state of the user on the touch screen display 240.

In various embodiments, the processor 260 may be configured to obtain the updated position information 201, the graphic object related to the weather information, and the graphic object related to the activity state of the user based on at least one of a first graphic object DB (database) including at least one first graphic object related to the activity state of the user, a second graphic object DB including at least one second graphic object related to the position information of the device 201, and a third graphic object DB including at least one third graphic object related to the weather information, which are stored in the memory 220 or server, and display the obtained position information 201, graphic object related to the weather information, and graphic object related to the activity state of the user on the touch screen display 240.

In various embodiments, the processor 260 may be configured to identify whether the number of times a weather application is executed for a predetermined period exceeds a predetermined number of times or whether the weather application is running as a function within the electronic device 201, and identify the activity state of the user in a case that it is identified that the number of times the weather application is executed for the predetermined period exceeds the predetermined number of times or that the weather application is running as the function in the electronic device 201.

In various embodiments, after updating the weather information, the processor 260 may be configured to identify whether the activity state of the user is changed based on the at least one of the first sensor information received from the external electronic device or the second sensor information obtained through the sensor circuit 230. When it is identified that the activity state of the user is changed, the processor 260 may be configured to change the update period of the weather information to a period corresponding to the changed activity state of the user. When it is identified that the changed period has elapsed from the time when the weather information was updated, the processor 260 may be configured to update the weather information corresponding to the position information of the electronic device 201, and display at least one graphic object related to at least one of the position information, the weather information, and the changed activity state of the user on the touch screen display 240.

FIG. 3 is a flowchart 300 illustrating an example method for updating weather information based on an activity state of a user according to various embodiments.

With reference to FIG. 3, in operation 305, a processor (e.g., the processor 260 in FIG. 2) of an electronic device (e.g., the electronic device 201 in FIG. 2) may identify the activity state of the user of the electronic device 201, based on at least one of first sensor information received from an external electronic device or second sensor information obtained through a sensor circuit (e.g., the sensor circuit 230 in FIG. 2) (e.g., at least one sensor of a motion sensor, a geomagnetic sensor, an acceleration sensor, or a gyro sensor)).

In an embodiment, the external electronic device may be a wearable electronic device (e.g., a watch) connected to the electronic device 201 through a short-range communication circuit. The sensor information received from the external electronic device may include at least one of the biometric information (e.g., heart rate information) and health information of the user. The health information may include information about the activity state of the user determined by a user input (e.g., information about the activity state of the user as determined by a user input (an input to select for determining the activity state of the user in a UI (e.g., pop-up window) that queries whether the activity state is currently walking, running, or moving on a bicycle based on the sensor information acquired for a predetermined time) as the current walking, running, or moving on a bicycle and/or information about the activity state of the user automatically recognized by the external electronic device based on the sensor information acquired for a predetermined time.

In an embodiment, the sensor information received through the sensor circuit 230 may include sensor information related to the motion of the electronic device 201. For example, the processor 260 may obtain the second sensor information through the sensor circuit 230 for a predetermined time. The sensor information related to the motion of the electronic device 201 may include at least one of a moving speed of the electronic device 201, a degree of tilting of the electronic device 201, or a distance the electronic device 201 moved for a predetermined time.

In an embodiment, the processor 260 may determine the moving distance and/or moving speed of the electronic device 201. For example, the processor 260 may receive the position information of the electronic device 201 at predetermined time intervals through a positioning circuit (e.g., the positioning circuit 250 in FIG. 2). However, the disclosure is not limited thereto, and in an embodiment, when it is determined, for example, to be a situation (e.g., a shaded area) in which a signal related to the position information of the electronic device 201 cannot be received through the positioning circuit 250, the processor 260 may receive the position information of the electronic device 201 from at least one base station through a legacy network (e.g., the second network 199 in FIG. 1). The processor 260 may determine the distance the electronic device 201 moved for a predetermined time based on the position information (e.g., coordinate values according to the position information) of the electronic device 201.

In an embodiment, the processor 260 may determine the moving speed of the electronic device 201 based on the distance the electronic device 201 moved for a predetermined time. However, the disclosure is not limited thereto, and the processor 260 may determine the moving speed of the electronic device 201 through the sensor circuit 230, for example, an acceleration sensor.

In an embodiment, the processor 260 may determine the degree of tilting of the electronic device 201 measured through the sensor circuit 230, for example, a gyro sensor. For example, the degree of tilting of the electronic device 201 may refer to a change in an actual rotation amount of the electronic device 201.

In an embodiment, the processor 260 may identify the activity state of the user based on the first sensor information received from external electronic device and/or the second sensor information obtained through sensor circuit 230, for example, based on at least one of the biometric information, health information of the user, the moving speed or degree of tilting of the electronic device 201, or the distance the electronic device 201 moved for a predetermined time.

In various embodiments, the activity state of the user may include the first state, the second state, and/or the third state, but is not limited thereto. The first state of the user may be defined as a state in which the user equipped with the electronic device 201 is moving in a vehicle. The second state of the user may be defined as a state in which the user equipped with the electronic device 201 is moving on a bicycle. The third state of the user may be defined as a state in which the user equipped with the electronic device 201 is running or walking. However, the disclosure is not limited thereto, and the activity state of the user may include outdoor activities such as sports activities (e.g., climbing).

In an embodiment, the processor 260 may identify the activity state of the user based on the biometric information of the user, for example, heart rate information. For example, the processor 260 may identify whether heart rate information of the user exceeds a predetermined heart rate. The predetermined heart rate may include a first predetermined heart rate and a second predetermined heart rate, but is not limited thereto. In an embodiment, the first predetermined heart rate may be greater than the second predetermined heart rate.

For example, when it is identified that the heart rate information of the user exceeds the first predetermined heart rate, the processor 260 may determine that it is in a state in which the user is moving on a bicycle (e.g., the second state) or in a state in which the user is running (e.g., the third state). The processor 260 may determine that it is in a state in which the user equipped with the electronic device 201 is walking (e.g., the third state) when it is identified that the heart rate information of the user is less than or equal to the first predetermined heart rate and exceeds the second predetermined heart rate. When it is identified that the heart rate information of the user is less than or equal to the second predetermined rate, the processor 260 may determine that it is a state in which the user equipped with the electronic device 201 is moving in a vehicle (e.g., the first state).

In an embodiment, the processor 260 may identify the activity state of the user based on health information of the user. For example, the processor 260 may identify the activity state of the user identified by a user input or the activity state of the user automatically recognized by an external electronic device.

In an embodiment, the processor 260 may identify the activity state of the user based on the moving speed of the electronic device 201. For example, the processor 260 may identify whether the moving speed of the electronic device 201 exceeds a predetermined speed. The predetermined speed may include a first predetermined speed and a second predetermined speed, but is not limited thereto. In an embodiment, the first predetermined speed may be greater than the second predetermined speed.

For example, when it is identified that the moving speed of the electronic device 201 exceeds the first predetermined speed, the processor 260 may determine that it is in a state in which the user equipped with the electronic device 201 is moving in a vehicle (e.g., the first state). When it is identified that the moving speed of the electronic device 201 is less than or equal to the first predetermined speed and exceeds the second predetermined speed, the processor 260 may determine that the user equipped with the electronic device 201 is moving on a bicycle (e.g., the second state). When it is identified that the moving speed of the electronic device 201 is less than or equal to the second predetermined speed, the processor 260 may determine that it is a state in which the user is walking or running (e.g., the third state).

In an embodiment, the processor 260 may identify the activity state of the user based on the degree of tilting of the electronic device 201. For example, the processor 260 may identify whether the degree of tilting of the electronic device 201 exceeds a predetermined number of times.

For example, when it is identified that the degree of tilting of the electronic device 201 exceeds a predetermined number of times, the processor 260 may determine that it is a state in which the user equipped with the electronic device 201 is moving on a bicycle (e.g., the second state). When it is identified that the degree of tilting of the electronic device 201 is less than or equal to the predetermined number of times, the processor 260 may determine that it is a state in which the user equipped with the electronic device 201 is moving in a vehicle (e.g., the first state), or a state in which the user is walking or running (e.g., the third state).

For example, in a case that the user equipped with the electronic device 201 is moving on a bicycle (e.g., the second state), since there may be a high possibility of being affected by a road (e.g., pavement condition of a road) compared to other states (e.g., the first state and the third state), the processor 260 may determine that it is a state in which the user is moving on a bicycle (e.g., the second state) when it is identified that the degree of tilting of the electronic device 201 exceeds a predetermined number of times.

In an embodiment, the processor 260 may identify the activity state of the user based on the distance the electronic device 201 moved for a predetermined time. For example, the distance the electronic device 201 moved for a predetermined time may include a first predetermined distance and a second predetermined distance, but is not limited thereto. In an embodiment, the first predetermined distance may be greater than the second predetermined distance.

For example, when it is identified that the distance the electronic device 201 moved for a predetermined time exceeds the first predetermined distance, the processor 260 may determine that it is a state in which the user equipped with the electronic device 201 is moving in a vehicle (e.g., the first state). When it is identified that the distance the electronic device 201 moved for a predetermined time is less than or equal to the first predetermined distance and exceeds the second predetermined, the processor 260 may determine that it is a state in which the user equipped with the electronic device 201 is moving on a bicycle (e.g., the second state). When it is identified that the distance the electronic device 201 moved for a predetermined time is less than or equal to the second predetermined distance, the processor 260 may determine that it is a state in which the user with the electronic device 201 is walking or running (e.g., the second state).

In various embodiments, it has been described that the activity state of the user is identified based on the first sensor information received from an external electronic device and/or the second sensor information obtained through the sensor circuit 230, but is not limited thereto.

For example, the user may be in the first state (e.g., a state in which the user equipped with the electronic device 201 is moving in a vehicle), but the moving speed of the electronic device 201 may be less than or equal to the first predetermined speed while exceeding the second predetermined speed, and the distance the electronic device 201 moved for a predetermined time may be less than or equal to the first predetermined distance while exceeding the second predetermined distance (e.g., a state of slow speed). In this case, the processor 260 may determine the activity state of the user to be the second state (e.g., a state in which the user equipped with the electronic device 201 is moving on a bicycle) based on the moving speed of the electronic device 201 and the distance the electronic device 201 moved for a predetermined time.

For another example, the user may be in the first state (e.g., a state in which the user equipped with the electronic device 201 is moving in a vehicle), but the moving speed of the electronic device 201 may be less than or equal to the second predetermined speed and the distance the electronic device 201 moved for a predetermined time may be also less than or equal to the second predetermined distance (e.g., congested state). In this case, the processor 260 may determine the activity state of the user to be the third state (e.g., a state in which the user is walking or running) based on the moving speed of the electronic device 201 and the distance the electronic device 201 moved for a predetermined time.

Considering that the actual activity state of the user and the activity state of the user determined by the processor 260 may be different from each other as described above, in various embodiments, the processor 260 may identify the activity state of the user by further considering external information, in addition to information about motion of the electronic device 201. The external information may include at least one of the position information of the electronic device 201, information about a communication connection state with an external electronic device, ambient noise information, additional information configured in the electronic device 201 (e.g., schedule information (e.g., travel information and/or ticket reservation information (e.g., airplane and/or train reservation information)), or access point (AP) information.

For example, in a case of determining the activity state of the user by further considering the position information of the electronic device 201, the processor 260 may identify whether it is a state in which the user with the electronic device 201 is located on a road and is moving or is located on a sidewalk and is moving, based on the position information of the electronic device 201 obtained through the positioning circuit 250 and a positioning sensor (not illustrated). When it is identified that it is a state in which the user with the electronic device 201 is located on a road and is moving, the processor 260 may identify the activity state of the user as the first state (e.g., a state in which the user is moving in a vehicle) or the second state (e.g., a state in which the user is moving on a bicycle). When it is identified that the user with the electronic device 201 is located on a sidewalk and is moving, the processor 260 may identify the activity state of the user as the second state (e.g., a state in which the user is moving on a bicycle) or the third state (e.g., a state in which the user is running or walking).

For another example, in a case of identifying the activity state of the user by further considering information about the communication connection state with an external electronic device, the processor 260 may identify whether the communication connection with the vehicle is established through a short-range communication circuit (e.g., the first network 198 in FIG. 1). In a case that the electronic device 201 transmits and receives a signal through the communication connection with a vehicle through a short-range communication circuit, the processor 260 may identify the activity state of the user as the first state (e.g., a state in which the user is moving in a vehicle).

As another example, in a case of identifying the activity state of the user by further considering ambient noise information, the processor 260 may obtain ambient noise through an audio module (e.g., a microphone (e.g., the input module 150 in FIG. 1) of the audio module 170 in FIG. 1). The processor 260 may analyze a level of the acquired ambient noise and identify whether the level of ambient noise exceeds a predetermined value. For example, when the level of ambient noise exceeds a predetermined value (e.g., a case in which the electronic device 201 is located in a place where noise is generated (e.g., outdoors)), the processor 260 may identify the activity state of the user as the second state (e.g., a state in which the user equipped with the electronic device 201 is moving on a bicycle) or the third state (e.g., a state in which the user equipped with the electronic device 201 is running or walking). When the level of ambient noise is less than a predetermined value (e.g., a case in which the electronic device 201 is located in a place where noise is weak or noise does not occur (e.g., indoors)), the processor 260 may identify the activity state of the user as the first state (e.g., a state in which the user equipped with the electronic device 201 is moving in a vehicle).

For another example, in a case of identifying the activity state of the user by further considering additional information configured in the electronic device 201 (for example, schedule information), the processor 260 may identify the travel information registered in the schedule information, and information about means for moving to a travel destination (e.g., ticket reservation information (e.g., flight and/or train reservation information)) and may identify the activity state of the user.

As another example, in a case of identifying the activity state of the user by further considering access point (AP) information, the processor 260 may identify the position information of the electronic device 201 based on information about the AP located around the electronic device 201, and may identify the activity state of the user based on the identified position information.

In various embodiments, the activity state of the user is identified based on the sensor information related to the motion of the electronic device 201, for example, each of the moving speed of the electronic device 201, the degree of tilting of the electronic device 201, and the distance the electronic device 201 moved for a predetermined time, and external information, for example, each of the position information of the electronic device 201, the information about a communication connection state with an external electronic device, the ambient noise information, the additional information, and the AP information. However, the disclosure is not limited in this respect.

For example, the processor 260 may determine the activity state having a high probability calculated by a combination of the moving speed of the electronic device 201, the degree of tilting of the electronic device 201, the distance the electronic device 201 moved for a predetermined time, the position information of the electronic device 201, the information about a communication connection state with an external electronic device, the ambient noise information, the additional information, and/or the AP information as the activity state of the user.

For another example, the processor 260 may configure a weight for each of the moving speed of the electronic device 201, the degree of tilting of the electronic device 201, the distance the electronic device 201 moved for a predetermined time, the position information of the electronic device 201, the information about a communication connection state with an electronic device, the ambient noise information, the additional information, and/or the AP information. The processor may determine the activity state having a high probability calculated based on the configured weight as the activity state of the user.

As another example, information related to the activity state of the user (e.g., a pattern for the activity state of the user) may be pre-stored in an external electronic device (e.g., an external server). The processor 260 may compare the sensor information related to the motion of the electronic device 201 with the information related to the activity state of the user received from an external electronic device (e.g., an external server), and identify the activity state of the user based on the comparison. Alternatively, the processor 260 may transmit the sensor information related to the motion of the electronic device 201 to an external electronic device (e.g., an external server). An external electronic device (e.g., an external server) may compare the sensor information related to the motion of the electronic device 201 received from the electronic device 201 with pre-stored information related to the activity state of the user, and may identify the activity state of the user based on the comparison result. An external electronic device (e.g., an external server) may transmit the identified activity state of the user to the electronic device 201.

In an embodiment, in operation 310, the processor 260 may update weather information corresponding to the position information of the electronic device 201 when an update period of weather information corresponding to the identified activity state of the user arrives.

For example, when the activity state of the user is identified as the first state (e.g., a state in which the user equipped with the electronic device 201 is moving in a vehicle), the processor 260 may determine to update the weather information at a first period of time (e.g., 20 minutes) corresponding to the first state. When the activity state of the user is identified as the second state (e.g., a state in which the user equipped with the electronic device 201 is moving on a bicycle), the processor 260 may determine to update the weather information at a second period of time (e.g., 30 minutes) corresponding to the second state. The second period of time (e.g., 30 minutes) may be longer than the first period of time (e.g., 20 minutes). When the activity state of the user is identified as the third state (e.g., a state in which the user equipped with the electronic device 201 is running or walking), the processor 260 may determine to update the weather information at a third period of time (e.g., 60 minutes) corresponding to the third state. The third period of time (e.g., 60 minutes) may be longer than the second period of time (e.g., 30 minutes).

The disclosure is not limited to thereto, and, in a case which is identified as a state faster than a state in which the user is moving in a vehicle (e.g., the first state), for example, a case in which it is identified as a third predetermined speed greater than a first predetermined speed (e.g., boarding a high-speed train or an airplane), it may be identified to update the weather information at a period of time faster than the first period of time.

In an embodiment, when the first period of time, the second period of time, or the third period of time corresponding to the activity state of the user, for example, the first state, the second state, or the third state arrives, it may update the weather information corresponding to the position information of the electronic device 201 (e.g., position information received from a positioning circuit (e.g., the positioning circuit 250 in FIG. 2) (e.g., a GPS circuit and/or a GNSS circuit)).

The times described as the first period of time, the second period of time, and the third period of time (e.g., 20 minutes, 30 minutes, and 60 minutes) according to various embodiments are merely an example embodiment, and the disclosure is not limited to these periods of time or to this number of periods of times.

In an embodiment, in operation 315, the processor 260 may display at least one graphic object related to at least one of position information, weather information, or the activity state of the user on a touch screen display (e.g., the touch screen display 240 in FIG. 2).))

In an embodiment, a graphic object related to the position information may be, for example, a graphic object related to information about an area on a map (e.g., information about local administration (e.g., cities divided by administrative districts) or representative landmark information in the area) corresponding to the latitude and longitude coordinate information of the electronic device 201 obtained by the positioning circuit 250 (e.g., the GPS circuit and/or the GNSS circuit) and/or information about the geography of the area (e.g., mountains, sea, countryside). For example, the graphic object related to position information may include a graphic object representing a predetermined city (e.g., Seoul or 63 Building), a graphic object representing a mountain, and/or a graphic object representing the sea, but is not limited thereto.

In an embodiment, a graphic object related to weather information may include, for example, a graphic object representing clear, a graphic object representing cloudy, a graphic object representing rain, and/or a graphic object representing snow, but is not limited thereto.

In an embodiment, a graphic object related to the activity state of the user may include, for example, a graphic object representing the first state in which the user is moving in a vehicle, a graphic object representing the second state in which a user is moving on a bicycle, and/or a graphic object representing the third state in which the user is walking or running.

In various embodiments, the above-described position information, weather information, and activity state of the user may be classified in the form of tags, and the graphic objects related to the position information, weather information, and activity state of the user classified into the form of tags may be stored in a memory (e.g., may be stored in the memory 220 in FIG. 2). For example, the memory 220 may store a first graphic object DB including at least one first graphic object related to the activity state of the user (e.g., walking, running, on a bicycle, in a vehicle), a second graphic object DB including at least one second graphic object related to the position information of the electronic device 201 (e.g., a mountain, sea, city, countryside, house, office), and/or a third graphic object DB including at least one third graphic object related to weather information (e.g., clear, cloudy, rain, strong wind, hail, snow). The processor

260 may combine the graphic object tagged with the position information of the electronic device 201, the graphic object tagged with the weather information corresponding to the position information, and the graphic object tagged with the activity state of the user, among the graphic objects stored in the memory 220, and may display the combined graphic objects.

The disclosure is not limited thereto, and the graphic objects corresponding to the position information, the weather information, and the activity state of the user, classified in the form of tags may be stored in an external server. In this case, the processor 260 may transmit a signal requesting the graphic object tagged with the position information of the electronic device 201, the graphic object tagged with the weather information corresponding to the position information, and the graphic object tagged with the activity state of the user to an external server. In response to the request signal, the processor 260 may receive the graphic object tagged with the position information of the electronic device 201, the graphic object tagged with the weather information corresponding to the position information, and the graphic object tagged with the activity state of the user from an external server, and then, may display the received graphic objects on the touch screen display 240.

In various embodiments, operations 305, 310 and 315 described above may be repeatedly performed at predetermined time intervals.

In various embodiments, the processor 260 may include a main processor (e.g., the main processor 121 in FIG. 1) and an auxiliary processor (e.g., the auxiliary processor 123 in FIG. 1) for controlling the sensor circuit 230. For example, the operation of acquiring sensor information through the sensor circuit 230 for a predetermined time may be performed by the auxiliary processor 123 to operate with low power. The auxiliary processor 123 may transmit the sensor information acquired through the sensor circuit 230 for a predetermined time to the main processor 121.

In FIG. 3, according to various embodiments, the user may be in an active state with the electronic device 201. For example, the user may be walking, running, moving on a bicycle, or moving in a vehicle (e.g., a car, a bus, a subway, or an airplane). Depending on the activity state of the user, the biometric information, the health information, the moving speed, degree of tilting, moving distance for a predetermined time of the electronic device 201 and/or external information may be different, and the processor 260 may configure different periods for updating weather information based on them. For example, in a case that there is a high possibility of position change for a predetermined time according to the activity state of the user, weather information may be updated at a relatively short period of time (e.g., a third period of time). Alternatively, in a case that there is a low possibility of position change for a predetermined time, weather information may be updated at a relatively long period of time (e.g., a first period of time). Accordingly, suitable weather information according to the motion (e.g., movement) of the electronic device 201 or user may be provided to the user.

Figure 4:
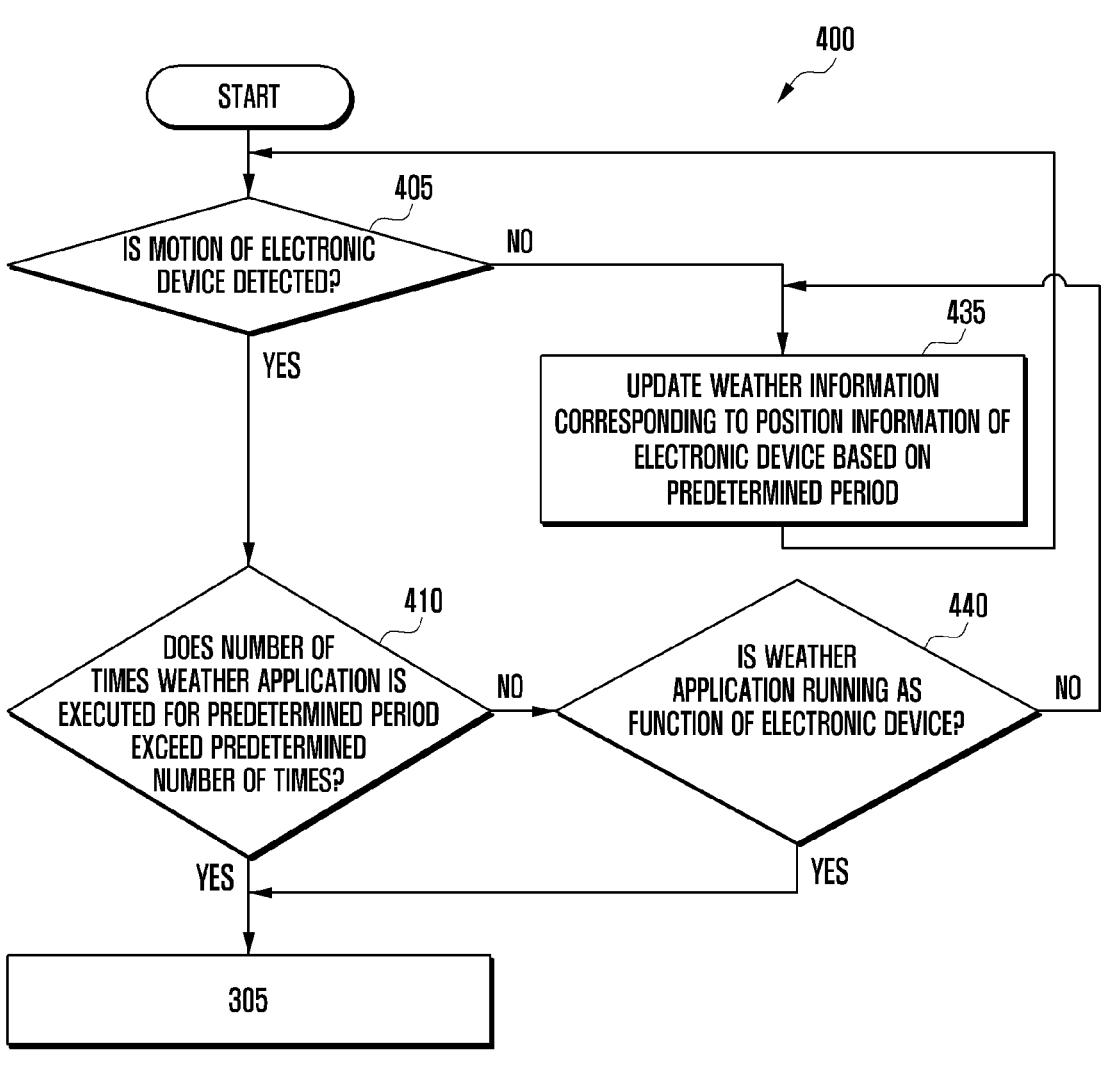
FIG. 4 is a flowchart illustrating an example method for updating weather information based on an activity state of a user according to various embodiments.

FIG. 4 is a flowchart 400 illustrating an example method for updating weather information based on an activity state of a user, according to various embodiments.

According to various embodiments, FIG. 4 may, for example, be an operation that may be performed before operation 305 in FIG. 3 described above.

With reference to FIG. 4, in operation 405, a processor (e.g., the processor 260 in FIG. 2) of an electronic device (e.g., the electronic device 201 in FIG. 2) may identify whether motion of the electronic device 201 is detected. When the motion of the electronic device 201 is not detected (e.g., NO in operation 405), the processor 260 may update weather information corresponding to position information of the electronic device 201 based on a predetermined period in operation 435. For example, the predetermined period may include a period of time configured by the user or a period of time configured as a default in the electronic device 201 so that the weather information is automatically updated.

In an embodiment, when the motion of the electronic device 201 is detected (e.g., YES in operation 405), the processor 260 may identify whether the number of times (e.g., frequency of execution) a weather application is executed for a predetermined period exceeds a predetermined number of times in operation 410. When the number of times the weather application is executed for a predetermined period exceeds a predetermined number of times (e.g., YES in operation 410), the processor 260 may perform operations 305, 310, and 315 in FIG. 3. For example, the processor 260 may identify the activity state of the user of the electronic device 201 (e.g., the first state, the second state, or the third state), based on the first sensor information received from an external electronic device and/or the second sensor information obtained through a sensor circuit (e.g., the sensor circuit 230 in FIG. 2) (e.g., at least one of a motion sensor, a geomagnetic sensor, an acceleration sensor, and a gyro sensor). When an update period (e.g., the first period of time, the second period of time, or the third period of time) of weather information corresponding to the identified activity state of the user arrives, the processor 260 may update the weather information corresponding to the position information of the electronic device 201. The processor 260 may display at least one graphic object related to at least one of position information, weather information, and the activity state of the user on a touch screen display (e.g., the touch screen display 240 in FIG. 2).

In an embodiment, when the number of times the weather application is executed for the predetermined period does not exceed a predetermined number of times (e.g., NO in operation 410), the processor 260 may identify whether the weather application is running as a function in the electronic device 201 in operation 440. For example, a state in which the weather application is running as a function in the electronic device 201 may include a state in which the weather application is displayed on a lock screen and/or home screen in the form of a widget, a state in which the weather information is configured as an always on display (AOD) function, and/or a state in which it is configured to display the weather information along with schedule information as an additional function in a predetermined application (e.g., a calendar application). However, the disclosure is not limited thereto.

In an embodiment, in a case that the weather application is running as a function in the electronic device 201 (e.g., YES in operation 440), the processor 260 may perform operations 305, 310, and 315 in FIG. 3. In a case that the weather application is not running as a function in the electronic device 201 (e.g., NO in operation 440), the processor 260 may update the weather information corresponding to the position information of the electronic device 201 based on a predetermined period in operation 435.

According to various embodiments, in FIG. 4, in the case that the number of times the weather application is executed for a predetermined period exceeds a predetermined number of times or in the case that the weather application is running as a function in the electronic device 201, the processor 260 may recognize that the user is very interested in weather information. In this case, the processor 260 may identify the activity state of the user (e.g., the first state, the second state, or the third state) based on the first sensor information received from an external electronic device and/or the second sensor information obtained through the sensor circuit 230, may configure an update period of the weather information corresponding the identified activity state, and thus may provide the weather information suitable for the current activity state of the user in real time.

Figure 5:
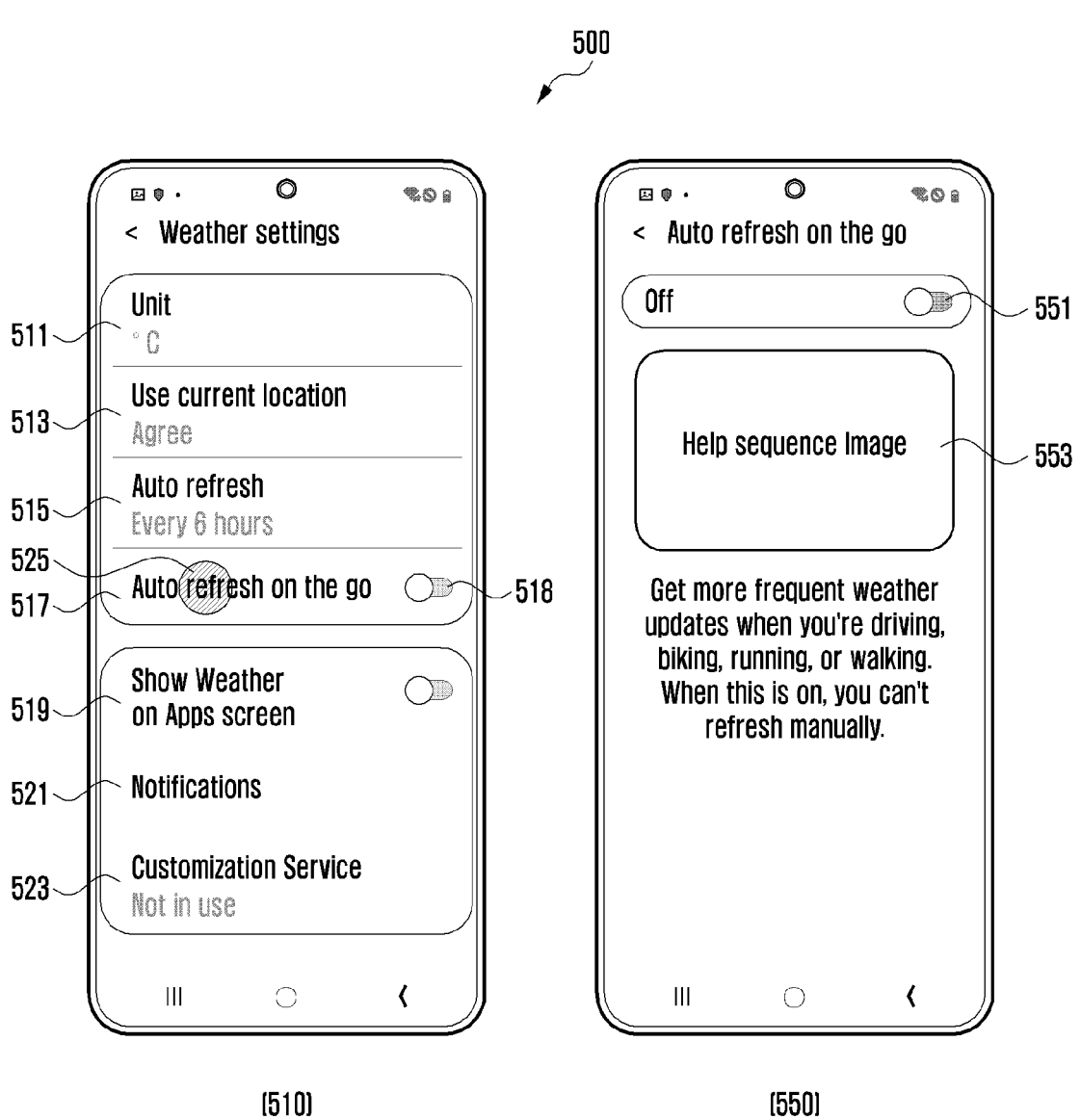
FIG. 5 is a diagram illustrating an example method for updating weather information based on an activity state of a user according to various embodiments.

FIG. 5 is a diagram 500 illustrating an example method for updating weather information based on an activity state of a user, according to various embodiments.

With reference to FIG. 5, when an input for weather configuration is detected, a processor (e.g., the processor 260 in FIG. 2) of an electronic device (e.g., the electronic device 201 in FIG. 2) may display a user interface related to weather configuration, as illustrated by reference numeral <510>. The user interface related to weather configuration may include an item (Unit) 511 for configuring the unit of weather (e.g., temperature), an item (Use current location) 513 for configuring whether to use current position information, an item (Auto refresh) 515 for configuring whether to perform automatic update (e.g., automatic update of weather information at predetermined time intervals), an item (Auto refresh on the go) 517 for configuring whether to update weather information based on the activity state of the user, an item (Show Weather on Apps screen) 519 for configuring whether to apply current weather information to an object (e.g., icon) representing a weather application, an item (Notification) 521 for configuring a weather notification, and/or an item (Customization Service) 523 for configuring a customized weather service. However, the disclosure is not limited thereto.

In an embodiment, the processor 260 may detect an input 525 for selecting the item 517 for configuring whether to update weather information based on the activity state of the user among a plurality of items included in the user interface related to weather configuration. In response to detecting the input 525 for selecting the item 517 for configuring whether to update weather information based on the activity state of the user, the processor 260, as illustrated by reference numeral <550>, may display a user interface for configuring update of weather information based on the activity state of the user.

For example, the user interface for configuring update of weather information based on the activity state of the user may display a toggle key 551 capable of turning the update on or off and an area 553 for guiding an update period according to the activity state of the user. The area 553 for guiding an update period according to the activity state of the user according to an embodiment may include, for example, information about updating the weather information at the first period of time (e.g., 20 minutes) in a case that the user is in the first state (e.g., a state in which the user equipped with the electronic device 201 is moving in a vehicle), information about updating the weather information at the second period of time (e.g., 30 minutes) in a case that the user is in the second state (e.g., the user equipped with the electronic device 201 is moving on a bicycle), and information about updating the weather information at the third period of time (e.g., 60 minutes) in a case that the user is in the third state (e.g., the user with the electronic device 201 is running or walking).

In an embodiment, in a case that it is configured to update the weather information based on the activity state of the user (e.g., a case in which the toggle keys 518 and 551 are configured to on), the processor 260 may perform the above-described operations in FIG. 3 or FIG. 4, and may update the weather information at different time intervals according to the activity state of the user.

In various embodiments, in a case that it is configured to automatically update the weather information at a predetermined period of time and to update the weather information based on the activity state of the user, the processor 260 may update the weather information at the configured period of time based on a predetermined period of time and the activity state of the user.

In various embodiments, an item for manually updating the weather information may not be displayed in a case that it is configured to update the weather information based on the activity of the user (e.g., a case in which toggle keys 518 and 551 are configured to on).

Figure 6:
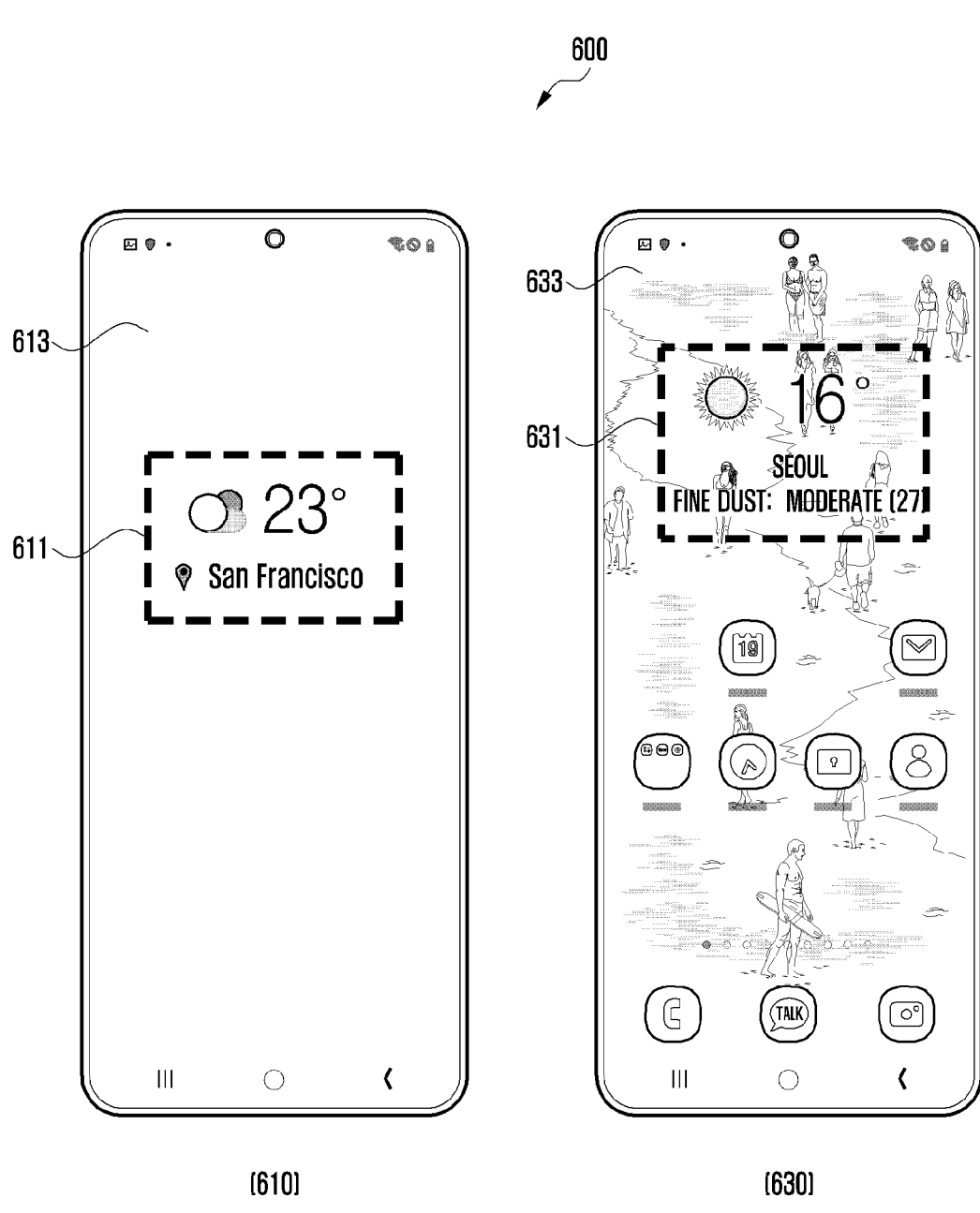
FIG. 6 is a diagram illustrating an example method for updating weather information based on an activity state of a user according to various embodiments.

FIG. 6 is a diagram 600 illustrating an example method for updating weather information based on an activity state of a user, according to various embodiments.

In various embodiments, a description is made on the assumption that a widget (hereinafter, weather widget) related to a weather application is displayed on a lock screen 613 and/or a home screen 633 (or configured to an always on display (AOD) function).

With reference to FIG. 6, a processor (e.g., the processor 260 in FIG. 2) may display the lock screen 613 or home screen 633 including weather the widgets 611 and 631 based on detecting an input for turning on a screen of an electronic device (e.g., the electronic device 201 in FIG. 2), as illustrated by reference numerals <610> and <630>. The disclosure is not limited thereto, and, in a case that the weather widget is configured as the AOD function, the processor 260 may display the lock screen 613 including the weather widget 611 even if a separate input is not detected.

In an embodiment, the weather widgets 611 and 631 may include objects representing current position information, temperature information and weather (e.g., clear, cloudy, rain, and/or snow) of the current position. However, the disclosure is not limited thereto, and, although not illustrated, the weather widgets 611 and 631 may further include weather information for each period/time, humidity information, precipitation information, precipitation probability information, snowfall information, and/or wind speed information.

In an embodiment, the processor 260 may identify the activity state of the user determined based the biometric information, health information of the user, the moving speed, degree of tilting, moving distance for a predetermined time of the electronic device 201, external information, additional information (e.g., schedule information (e.g., travel information and/or ticket reservation information (e.g., flight and/or train reservation information))), and/or access point (AP) information, and may determine an update period of the weather information corresponding to the activity state of the user. When the determined update period arrives, the processor 260 may receive weather information corresponding to the current position information of the electronic device 201 from an external server (e.g., a weather server), and may update the weather widgets 611 and 631 included in the lock screen 613 and/or home screen 633 based on the received weather information.

Figure 7:
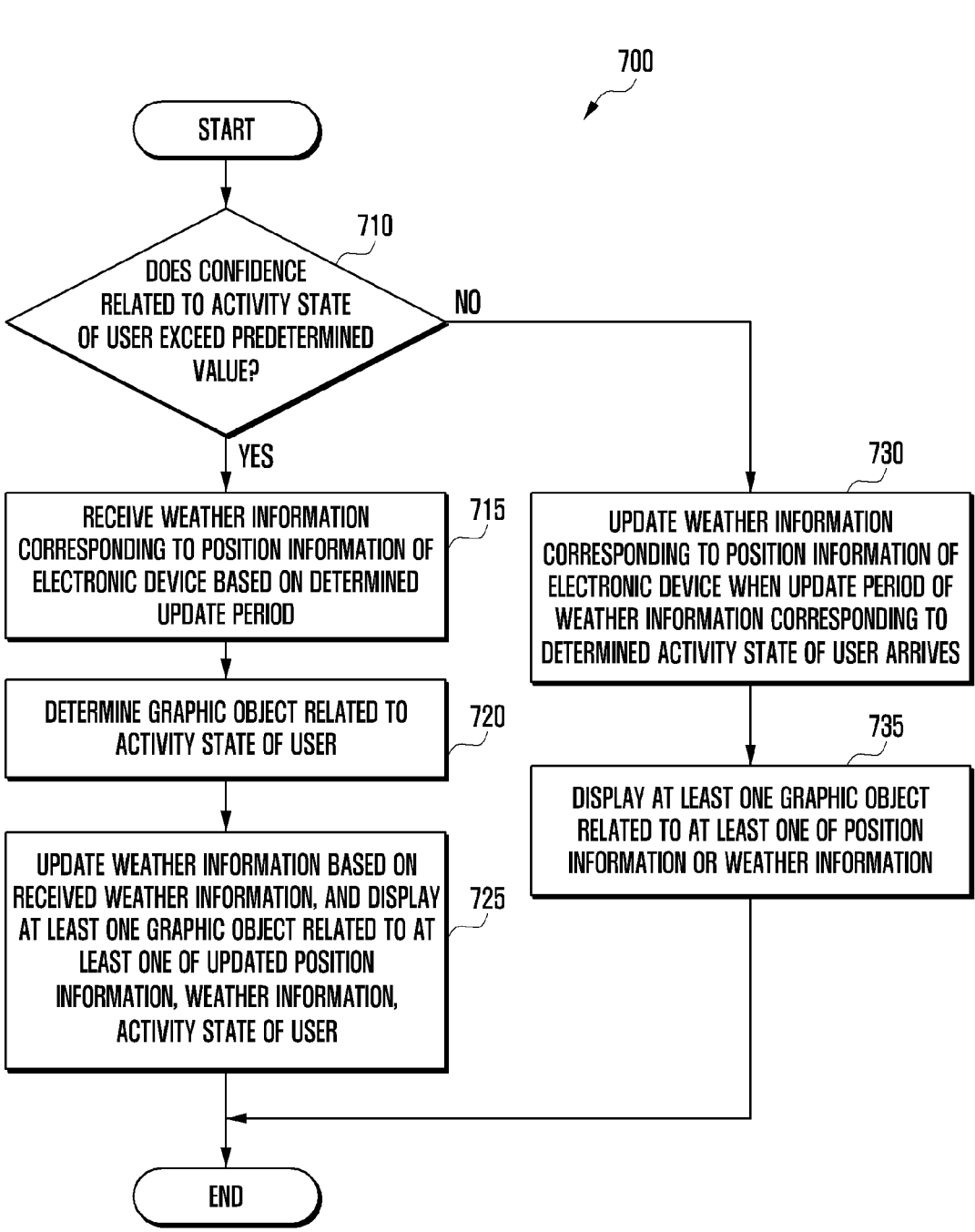
FIG. 7 is a flowchart illustrating an example method for updating weather information based on confidence related to an activity state of a user according to various embodiments.

FIG. 7 is a flowchart 700 illustrating an example method for updating weather information based on confidence related to an activity state of a user, according to various embodiments.

According to various embodiments, FIG. 7 may be an additional operation of operation 305 in FIG. 3 described above.

With reference to FIG. 7, a processor (e.g., the processor 260 in FIG. 2) of an electronic device (e.g., the electronic device 201 in FIG. 2) may identify, in operation 710, whether the confidence related to the activity state of the user exceeds a predetermined value (e.g., 80).

In various embodiments, the confidence related to the activity state of the user may be related to the accuracy of the activity state of the user (e.g., the first state, the second state, or the third state). For example, this may refer, for example, to a probability that the activity state of the user identified based on the first sensor information received from an external electronic device and/or the second sensor information obtained through a sensor circuit (e.g., the sensor circuit 230 in FIG. 2) is the same as the actual activity state of the user.

In an embodiment, the activity state of the user identified according to the above-described embodiments in FIGS. 3 and 4 and the sensor information corresponding to the identified activity state of the user may be accumulated and stored in a memory (e.g., the memory 220 in FIG. 2). The processor 260 may learn the activity state of the user or sensor information corresponding to the activity state of the user stored in the memory 220 in an artificial intelligence scheme (e.g., a deep learning scheme), and may calculate the confidence related to the activity state of the user based on the learning model learned.

In an embodiment, a level of confidence may refer, for example, to the probability that the activity state of the user is the same as the actual activity state of the user, that is, accuracy is high.

In an embodiment, in a case that the confidence related to the activity state of the user exceeds a predetermined value (e.g., YES in operation 710), the processor 260 may receive weather information corresponding to position information of the electronic device 201 based on the determined update period in operation 715.

In an embodiment, in operation 720, the processor 260 may determine a graphic object (e.g., an image or an animation image) related to the activity state of the user. For example, the graphic object related to the activity state of the user may include a graphic object for a state of moving in a vehicle representing the first state, a graphic object for a state of moving on a bicycle representing the second state, and/or a graphic object for a walking state or a running state indicating the third state.

In various embodiments, the activity state of the user described above may be classified in a form of tags, and the graphic objects related to the activity state of the user classified in a form of tags may be stored in the memory 220 or an external server. The processor 260 may determine a graphic object related to the activity state of the user among the graphic objects stored in the memory 220 or an external server.

In an embodiment, in operation 725, the processor 260 may update weather information based on the received weather information, and may display at least one graphic object (e.g., images or animated images) related to at least one of the position information of the electronic device 201, the weather information, or the activity state of the user on the touch screen display 240. For example, the processor 260 may display a graphic object tagged with the position information of the electronic device 201, a graphic object tagged with the weather information corresponding to the position information, and/or a graphic object tagged with the activity state of the user among the graphic objects stored in the memory 220 (or an external server).

The disclosure is not limited thereto, and the processor 260 may synchronize the updated weather information and an external electronic device (e.g., a wearable device and/or tablet) communicatively connected through a wireless communication circuit (e.g., the wireless communication circuit 210 in FIG. 2). In this case, by synchronizing the external electronic device (e.g., a wearable device and/or tablet), the updated weather information may be displayed on a display of the external electronic device.

In an embodiment, when the confidence related to the activity state of the user does not exceed a predetermined value (e.g., NO in operation 710), the processor 260 may update the weather information corresponding to the position information of the electronic device 201 in operation 730 when the update period of the weather information corresponding to the identified activity state of the electronic device 201 arrives. The processor 260 may display at least one graphic object related to at least one of the position information or the weather information on the touch screen display 240 in operation 735.

Figure 8:
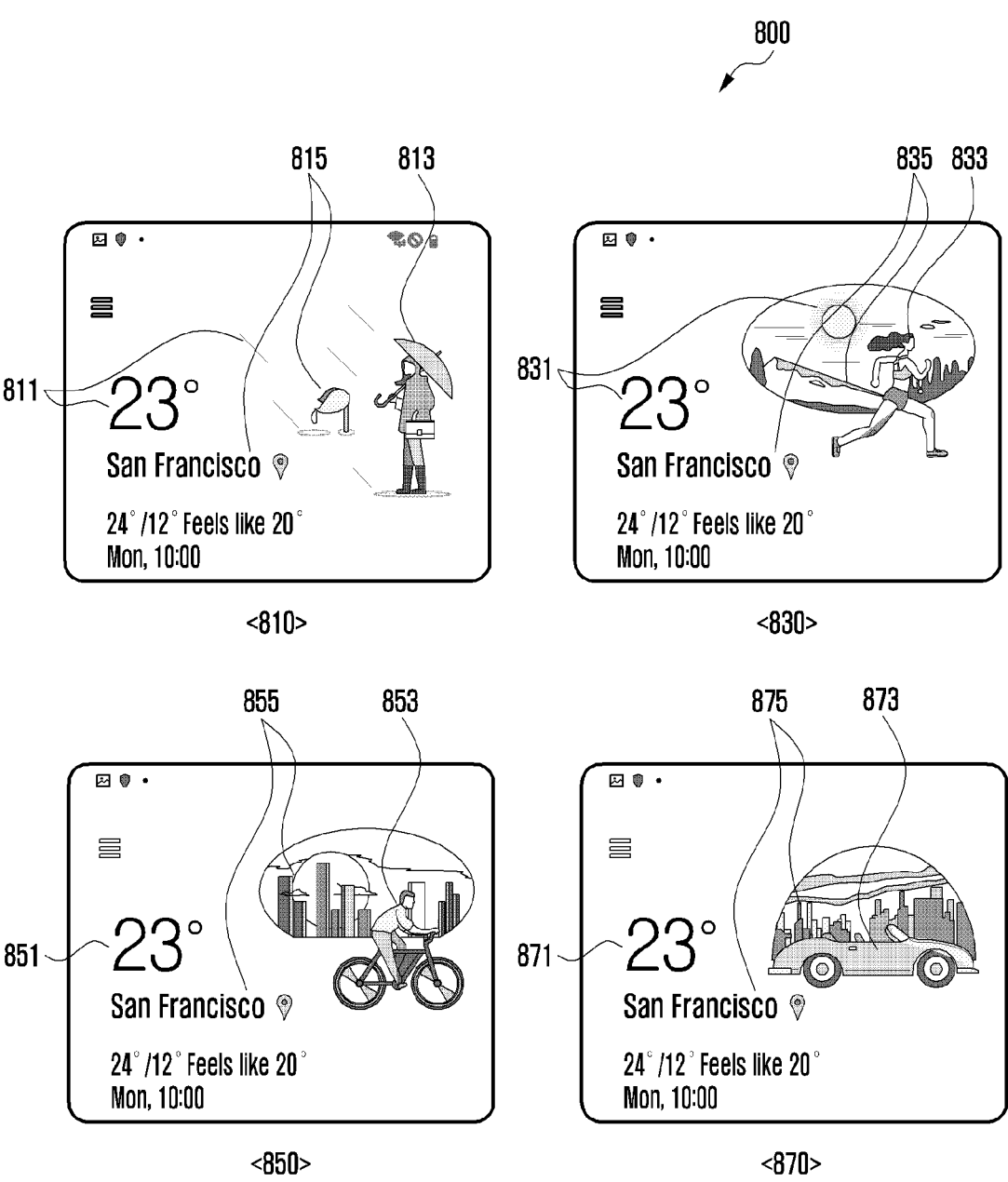
FIG. 8 is a diagram illustrating an example method for displaying weather information based on confidence related to an activity state of a user according to various embodiments.

FIG. 8 is a diagram 800 illustrating an example method for displaying weather information based on confidence related to an activity state of a user, according to various embodiments.

With reference to FIG. 8, a processor (e.g., the processor 260 in FIG. 2) may display a graphic object representing the activity state of the user when the confidence related to the activity state of the user exceeds a predetermined value (e.g., 80). In this case, the processor 260 may further display a graphic object representing updated position information of an electronic device (e.g., the electronic device 201 in FIG. 2) and/or weather information corresponding to the position information.

In an embodiment, the graphic object (e.g., an image or an animation image) related to the activity state of the user (e.g., activity) may include a graphic object for a state of moving in a vehicle representing the first state, a graphic object for a state of moving on a bicycle representing the second state, and/or a graphic object for a walking state or a running state indicating the third state. However, the disclosure is not limited thereto.

In an embodiment, the graphical object related to the position information may be a graphic object related to information about an area (e.g., information about local administration (e.g., cities divided by administrative districts) or representative landmark information in the area) on a map corresponding to the latitude and longitude coordinate information of the electronic device 201 obtained by a positioning circuit (e.g., the positioning circuit 250 in FIG. 2) (e.g., a GPS circuit and/or a GNSS circuit) and/or information about the geography of the area (e.g., mountains, sea, countryside). For example, the graphic object related to position information may include a graphic object representing a predetermined city (e.g., Seoul or 63 Building), a graphic object representing a mountain, and/or a graphic object representing the sea.

In an embodiment, an object related to weather information may include a graphic object representing clear, a graphic object representing cloudy, a graphic object representing rain, and/or a graphic object representing snow. However, the disclosure is not limited thereto.

For example, when the activity state of the user is identified as the third state (e.g., a walking state), based on the confidence for the third state exceeding a predetermined value, the processor 260 may display a graphic object 815 representing updated position information (e.g., a graphic object representing area information, an external place), a graphic object 811 representing weather information (e.g., a graphic object representing temperature information, rain), and a graphic object 813 representing a walking state, as illustrated by reference number <810>.

For another example, when the activity state of the user is identified as the third state (e.g., a running state), based on the confidence for the third state exceeding a predetermined value, the processor 260 may display a graphic object 835 representing updated position information (e.g., a graphic object representing area information, a mountain), a graphic object 831 representing weather information (e.g., a graphic object representing temperature information, clear), and a graphic object 833 representing a running state, as illustrated by reference number <830>.

For still another example, when the activity state of the user is identified as the second state (e.g., a state in which the user equipped with the electronic device 201 is moving on a bicycle), based on the confidence for the second state exceeding a predetermined value, the processor 260 may display a graphic object 855 representing updated position information (e.g., a graphic object representing area information, a mountain), a graphic object 851 representing weather information (e.g., temperature information), and a graphic object 853 representing a state of moving on a bicycle, as illustrated by reference number <850>.

For still another example, when the activity state of the user is identified as the first state (e.g., a state in which the user equipped with the electronic device 201 is moving in a vehicle), based on the confidence for the first state exceeding a predetermined value, the processor 260 may display a graphic object 875 representing updated position information (e.g., a graphic object representing area information, a mountain), a graphic object 871 representing weather information (e.g., temperature information), and a graphic object 873 representing a state of moving in a vehicle, as illustrated by reference number <870>.

In various embodiments, as shown in Table 1 below, the position information of the electronic device 201, the weather information, and the activity state of the user described above may be classified in a form of tags, and the graphic objects related to the position information of the electronic device 201, the weather information, and the activity state of the user, classified in the form of a tag may be stored in a memory (e.g., the memory 220 in FIG. 2) or an external server. For example, a first graphic object DB including at least one first graphic object related to the activity state of the user (e.g., walking, running, on a bicycle, in a vehicle), a second graphic object DB including at least one second graphic object related to the position information of the electronic device 201 (e.g., mountains, seas, cities, countryside, houses, and offices), and/or a third graphic object DB including at least one third graphic object related to weather information (e.g., clear, cloudy, rain, strong winds, hail, snow) may be stored in the memory 220.

TABLE 1

| Activity state of user | Weather information | Position information | Graphic object |
|---|---|---|---|
| #walking | #rain (e.g., #drizzle, #heavy rain) | #Park | Image tagged with #walking, #rain, #park |
| #running | #clear (sunny) | #Mountain | Image tagged with #running, #clear, #mountain |

TABLE 1-continued

| Activity state of user | Weather information | Position information | Graphic object |
|---|---|---|---|
| #bicycle | #cloudy (clouds) | #countryside | Image tagged with #bicycle, #cloudy, #countryside |
| #vehicle | #snow (heavy, light) | #city | Image tagged with #vehicle, #snow, #city |

In an embodiment, the processor 260 may combine and display graphic objects tagged with the position information of the electronic device 201, the weather information, and/or the activity state of the user among the graphic objects stored in the memory 220. For example, the processor 260 may search for a first graphic object tagged with the activity state of the user, a second graphic object tagged with the position information of the electronic device 201, and a third graphic tagged with the weather information from graphic object DBs. The processor 260 may combine the searched graphic objects and display the combined graphic objects on the touch screen display 240. For another example, the processor 260 may select an image having a high similarity among the graphic objects including the activity state of the user, the position information, and the weather information among the searched graphic objects and display the selected image on the touch screen display 240.

In an embodiment, the processor 260 may transmit a signal requesting a graphic object tagged with the position information of the electronic device 201, the weather information, and/or the activity state of the user to an external server. The processor 260 may receive the graphic object tagged with the position information of the electronic device 201, the weather information, and/or the activity state of the user from an external server in response to a request signal, and then, may display the received graphic object on the touch screen display 240.

According to various embodiments, in FIG. 8, a graphic object representing the position information of the electronic device 201, a graphic object representing the weather information, and a graphic object representing the activity state of the user may be displayed on the screen of a weather widget and/or a weather application. The disclosure is not limited thereto, and a graphic object representing the position information of the electronic device 201, a graphic object representing the weather information, and a graphic object representing the activity state of the user may be applied to and displayed on a user interface capable of displaying the weather information.

Figure 9:
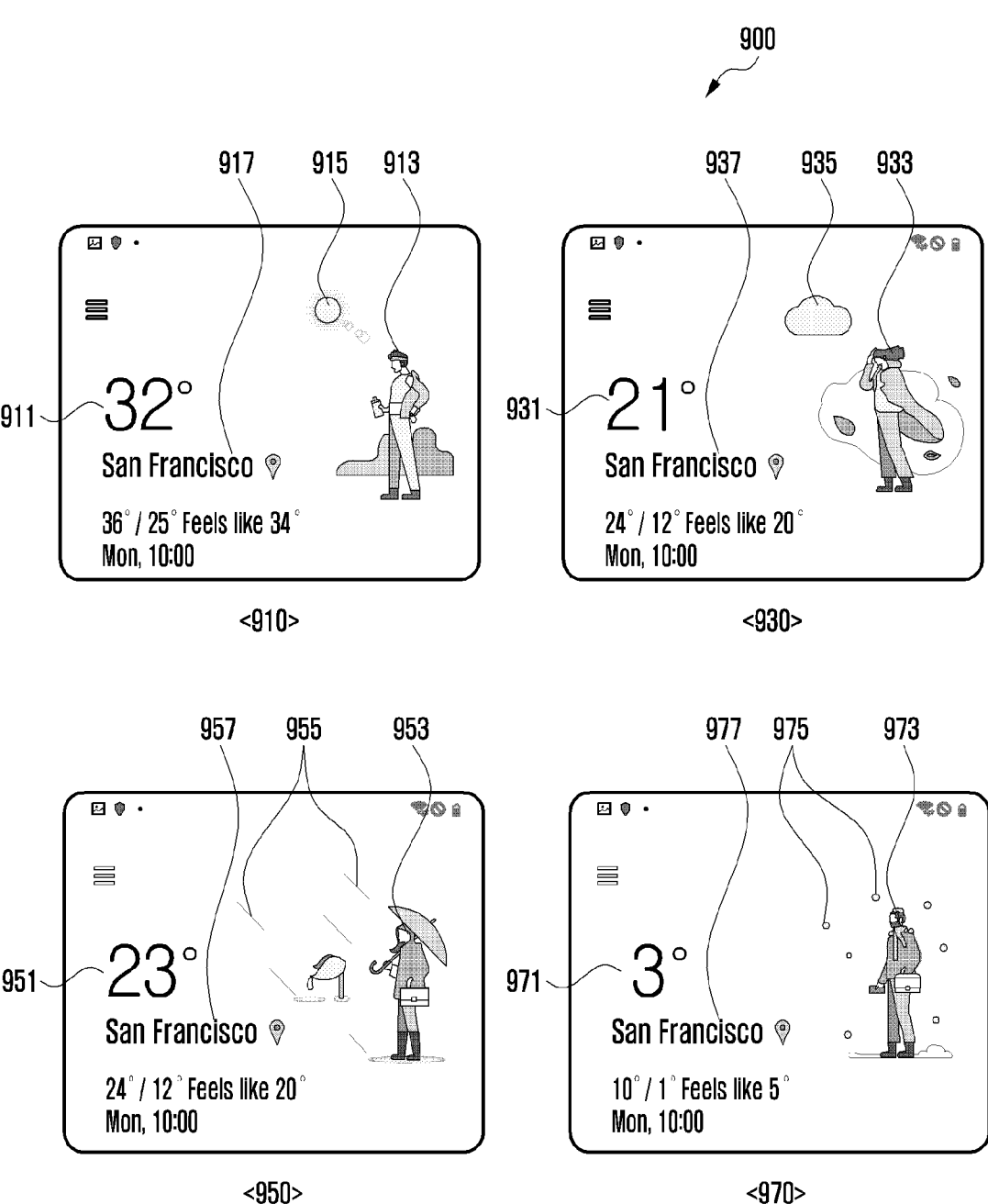
FIG. 9 is a diagram illustrating an example method for displaying weather information based on confidence associated with an activity state of a user according to various embodiments.

FIG. 9 is a diagram 900 illustrating an example method for displaying weather information based on confidence related to an activity state of a user, according to various embodiments.

According to various embodiments, FIG. 9 is a more detailed diagram of an example embodiment of displaying a graphic object representing weather information.

With reference to FIG. 9, when the confidence related to the activity state of the user exceeds a predetermined value, a processor (e.g., the processor 260 in FIG. 2) may display an object representing updated position information, an object representing weather information, and a graphic object representing the activity state of the user.

In an embodiment, an object related to weather information may include a graphic object representing clear, a graphic object representing cloudy, a graphic object representing rain, and/or a graphic object representing snow. However, the disclosure is not limited thereto.

For example, based on the confidence for the identified third state of the user (e.g., walking state) exceeding a predetermined value and the weather information identified to be "clear", the processor 260 may display a graphic object 917 representing updated position information (e.g., area information), graphic objects 911 and 915 representing weather information (e.g., graphic objects representing temperature information and clear), and/or a graphic object 913 representing a walking state, as illustrated by reference number <910>.

For another example, based on the confidence for the identified third state of the user (e.g., walking state) exceeding a predetermined value and the weather information identified to be "cloudy", the processor 260 may display a graphic object 937 representing updated position information (e.g., area information), graphic objects 931 and 935 representing weather information (e.g., graphic objects representing temperature information and cloudy), and/or a graphic object 933 representing a walking state, as illustrated by reference number <930>.

For still another example, based on the confidence for the identified third state of the user (e.g., walking state) exceeding a predetermined value and the weather information identified to be "rain", the processor 260 may display a graphic object 957 representing updated position information (e.g., area information), graphic objects 951 and 955 representing weather information (e.g., graphic objects representing temperature information and rain), and/or a graphic object 953 representing a walking state, as illustrated by reference number <950>.

For still another example, based on the confidence for the identified third state of the user (e.g., walking state) exceeding a predetermined value and the weather information identified to be "snow", the processor 260 may display a graphic object 977 representing updated position information (e.g., area information), graphic objects 971 and 975 representing weather information (e.g., graphic objects representing temperature information and snow), and/or a graphic object 973 representing a walking state, as illustrated by reference number <970>.

In various embodiments, a graphic object representing the activity state of the user may include an item and/or effect in which the weather information is reflected. For example, in a case that the weather information is identified to be "clear," an item in which the weather information is reflected, for example, sportswear, may be applied to the graphic object representing the activity state of the user. In a case that the weather information is identified to be "cloudy," an effect in which the weather information is reflected, for example, an effect of blowing the user's hair and/or clothes in the wind, may be applied to the graphic object representing the activity state of the user. In a case that the weather information is identified to be "rain", an item in which the weather information is reflected, for example, an umbrella, a raincoat, and/or boots, may be applied to the graphic object representing the activity state of the user. In a case that the weather information is identified to be "snow", an item in which the weather information is reflected, scarf, and/or an effect in which the weather information is reflected, snow accumulating on the user's head, may be applied to the graphic object representing the activity state of the user.

According to various embodiments, in FIG. 9, a graphic object representing the position information of the electronic device 201, a graphic object representing the weather information, a graphic object representing the activity state of the user, and an item and/or effect reflecting the weather information may be displayed on the screen of a weather widget and/or weather application. However, the disclosure is not limited thereto, and the graphic object representing the position information, the graphic object representing the weather information, the graphic object representing the activity state of the user, the item and/or effect reflecting the weather information may be applied to and displayed on a user interface capable of displaying the weather information.

Figure 10:
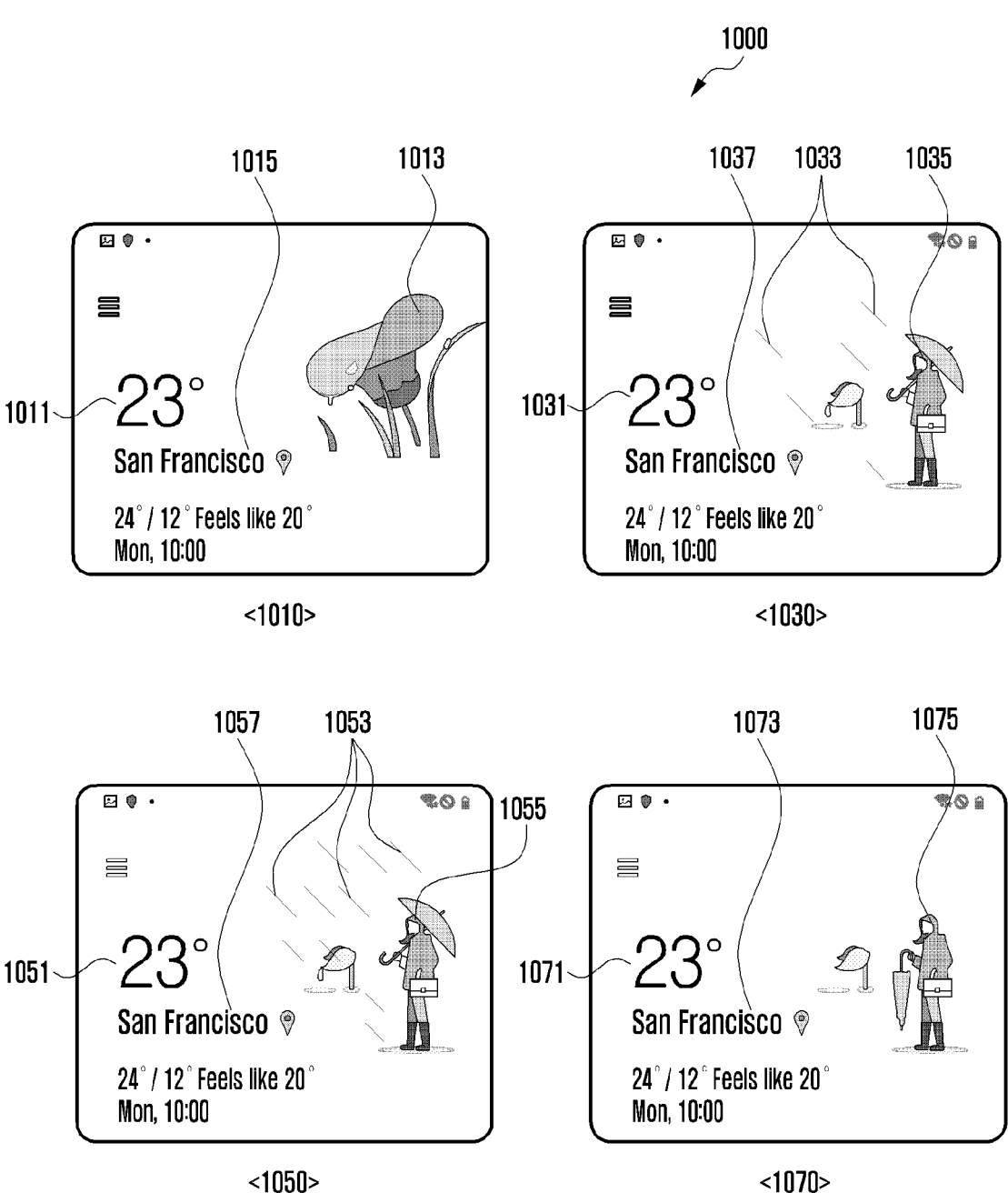
FIG. 10 is a diagram illustrating an example method for displaying weather information based on confidence associated with an activity state of a user according to various embodiments.

FIG. 10 is a diagram 1000 illustrating an example method for displaying weather information based on confidence related to an activity state of a user, according to various embodiments.

With reference to FIG. 10, a processor (e.g., the processor 260 in FIG. 2) may display a graphic object representing updated position information, a graphic object representing weather information, and a graphic object representing the activity state of the user, based on whether the confidence related to the activity state of the user exceeds a predetermined value.

For example, it is assumed that the activity state of the user is in the third state (e.g., walking state). Based on the confidence for the third state of the user (e.g., walking state) being less than or equal to a predetermined value and the weather information identified to be "rain", the processor 260 may display a graphic object 1015 representing updated position information (e.g., area information) and graphic objects 1011 and 1013 representing weather information (e.g., graphic objects representing temperature information and rain), as illustrated by reference number <1010>. In other words, based on the confidence for the activity state of the user being less than or equal to a predetermined value, a graphic object representing the activity state of the user may not be displayed.

For another example, based on the confidence for the third state of the user (e.g., walking state) exceeding a predetermined value and the weather information identified to be "rain", the processor 260 may display a graphic object 1037 representing updated position information (e.g., area information), graphic objects 1031 and 1033 representing weather information (e.g., graphic objects representing temperature information and rain), and a graphic object 1035 representing the walking state, as illustrated by reference number <1030>.

In an embodiment, the processor 260 may differently display the graphic object representing the weather information based on whether precipitation information among the weather information exceeds a predetermined amount of precipitation.

For example, based on the confidence for the third state of the user (e.g., walking state) exceeding a predetermined value, the weather information identified to be "rain", and the precipitation information being less than or equal to a predetermined amount of precipitation, the processor 260 may display a graphic object 1037 representing updated position information (e.g., area information), a graphic object 1031 representing weather information (e.g., temperature information), a graphic object 1033 representing "rain" with a small amount of precipitation, and a graphic object 1035 representing the walking state, as illustrated by reference number <1030>.

For still another example, based on the confidence for the third state of the user (e.g., walking state) exceeding a predetermined value, the weather information identified to be "rain", and the precipitation information exceeding a predetermined amount of precipitation, the processor 260 may display a graphic object 1057 representing updated position information (e.g., area information), a graphic object 1051 representing weather information (e.g., temperature information), a graphic object 1053 representing "rain" with a large amount of precipitation, and a graphic object 1055 representing the walking state, illustrated by reference number <1050>.

In an embodiment, the processor 260 may differently display the graphic object representing the weather information based on whether precipitation probability information among the weather information exceeds a predetermined precipitation probability.

For example, based on the confidence for the third state of the user (e.g., walking state) exceeding a predetermined value, the weather information identified to be "rain", and the precipitation probability information exceeding a predetermined precipitation probability, the processor 260 may display a graphic object 1057 representing updated position information (e.g., area information), a graphic object 1051 representing weather information (e.g., temperature information), a graphic object 1053 representing a high probability of precipitation, and a graphic object 1055 representing the walking state, as illustrated by reference number <1050>.

For another example, based on the confidence for the third state of the user (e.g., walking state) exceeding a predetermined value, the weather information identified to be "rain", and the precipitation probability information being less than or equal to a predetermined precipitation probability, the processor 260 may display a graphic object 1073 representing updated position information (e.g., area information), a graphic object 1071 representing weather information (e.g., temperature information) with a low probability of precipitation, and a graphic object 1075 representing the walking state (e.g., a graphic object representing a state in which the user wearing a raincoat is walking with an umbrella folded), as illustrated by reference number <1070>.

According to various embodiments, in FIGS. 8, 9, and 10, by displaying the graphic objects representing the activity state of the user, the position information, and/or the weather information, the user can intuitively identify the current position information, the weather information, and/or the activity state of the user based on the confidence related to the activity state of the user, the position information, and the weather information.

According to various embodiments, in FIG. 10, a graphic object representing the position information of the electronic device 201, a graphic object representing the weather information, and/or a graphic object representing the activity state of the user may be displayed on a screen of a weather widget and/or weather application. The disclosure is not limited thereto, and the graphic object representing the position information, the graphic object representing the weather information, and/or the graphic object representing the activity state of the user may be applied to and used on a user interface capable of displaying the weather information.

Figure 11:
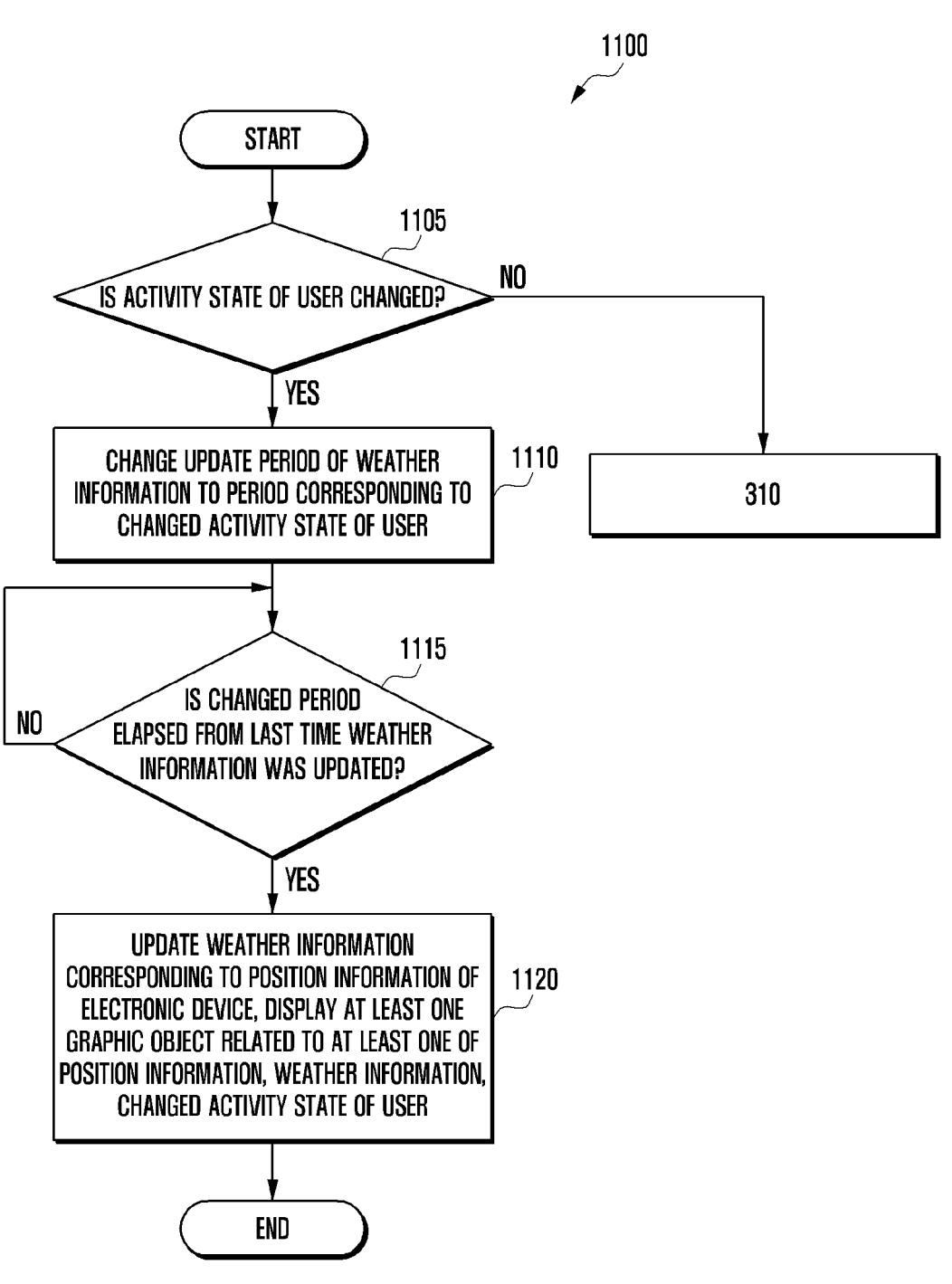
FIG. 11 is a flowchart illustrating an example a method for updating weather information based on a change in an activity state of a user according to various embodiments.

FIG. 11 is a flowchart 1100 illustrating an example method for updating weather information based on a change in an activity state of a user, according to various embodiments.

According to various embodiments, FIG. 11 may be an additional operation after performing operation 305 after a predetermined time elapses after updating weather information based on the above-described example embodiment in FIG. 3.

With reference to FIG. 11, in operation 1105, a processor (e.g., processor 260 in FIG. 2) of an electronic device (e.g., electronic device 201 in FIG. 2) may identify whether the activity state of the user is changed. For example, the processor 260 may identify whether the activity state of the user is changed from a first state (e.g., the activity state of the user identified in operation 305 in FIG. 3) to a second state or a third state, or whether the second state (e.g., the activity state of the user identified in operation 305 in FIG. 3) is changed to the first state or the third state, or whether the third state (e.g., the activity state of the user identified in operation 305 in FIG. 3) is changed to the first state or the second state, based on the first sensor information received from an external electronic device and/or the second sensor information obtained through the sensor circuit (e.g., the sensor circuit 230 in FIG. 2).

In an embodiment, when it is identified that the activity state of the user is changed (e.g., YES in operation 1105), the processor 260 may change the update period of weather information to a period corresponding to the changed activity state of the user in operation 1110.

In an embodiment, in operation 1115, the processor 260 may identify whether a changed period has elapsed from the last time the weather information was updated. When it is identified that the changed period has elapsed from the last time the weather information was updated (e.g., YES in operation 1115), the processor 260 may update the weather information corresponding to the position information of the electronic device 201 and/or the weather information corresponding to the position information, and may display at least one graphic object related to at least one of the position information, the weather information, or the changed activity state of the user on a touch screen display (e.g., the touch screen display 240 in FIG. 2) in operation 1120.

In an embodiment, when it is identified that the changed period has not elapsed from the last time the weather information was updated (e.g., NO of operation 1115), the processor 260 may repeatedly perform operation 1115.

In an embodiment, when it is identified that the activity state of the user is not changed (e.g., NO in operation 1105), the operation of the processor 260 goes to operation 310 in FIG. 3, and the processor 260 may update the weather information corresponding to the position information of the electronic device 201 based on the update period corresponding to the activity state of the user, and may display at least one graphic object related to at least one of the position information, the weather information, and the activity state of the user on the touch screen display 240.

According to various example embodiments, a method for updating the weather information based on the activity state of the user of the electronic device 201 may include identifying the activity state of the user based on at least one of first sensor information from an external electronic device connected through the wireless communication circuit 210 or second sensor information obtained through the sensor circuit 230, updating the weather information corresponding to the position information of the electronic device 210 when an update period of the weather information corresponding to the identified activity state of the user arrives, and displaying at least one graphic object related to at least one of the position information, the weather information, or the activity state of the user on the touch screen display 240.

According to various example embodiments, the first sensor information may include at least one of biometric information or health information.

According to various example embodiments, the second sensor information may include at least one of a moving speed of the electronic device 201, a degree of tilting of the electronic device 201, or a distance of the electronic device 201 moved for the predetermined time.

According to various example embodiments, the state of the user may include a first state, a second state, and a third state.

According to various example embodiments, the update period of the weather information corresponding to the activity state of the user may include a first period of time corresponding to the first state, a second period of time corresponding to the second state, and a third period of time corresponding to the third state.

According to various example embodiments, the second period of time may be longer than the first period of time, and the third period of time may be longer than the second period of time.

According to various example embodiments, the identifying the activity state of the user may include transmitting raw data for the at least one of the first sensor information or the second sensor information to a server through the wireless communication circuit 210, receiving a learning model learned through machine learning by artificial intelligence from the server, and identifying the activity state of the user based on the received learning model, or transmitting the raw data for the at least one of the first sensor information or the second sensor information to the server through the wireless communication circuit 210, receiving the activity state of the user corresponding to the at least one of the first sensor information or the second sensor information from the server, and identifying the activity state of the user based on the received activity state of the user corresponding to the at least one of the first sensor information or the second sensor information.

According to various example embodiments, the method for updating the weather information based on the activity state of the user of the electronic device 201 may further include accumulating and storing the identified activity state of the user and the at least one of the first sensor information or the second sensor information corresponding to the identified activity state of the user in the memory 220, learning the activity state of the user and the at least one of the first sensor information or the second sensor information corresponding to the activity state stored in the memory 220 in an artificial intelligence scheme, and calculating confidence related to the activity state of the user based on the learned learning model.

According to various example embodiments, the displaying the at least one graphic object on the touch screen display 240 may include identifying whether the calculated confidence related to the activity state of the user exceeds a predetermined value, receiving the weather information corresponding to the position information of the electronic device 201 from an external server when the update period corresponding to the identified activity state of the user arrives, in a case that the calculated confidence related to the activity state of the user exceeds the predetermined value, determining a graphic object related to the activity state of the user, and displaying the determined graphic object related to the activity state of the user on the touch screen display 240.

According to various example embodiments, the method for updating the weather information based on the activity state of the user of the electronic device 201 may further include identifying whether a number of times a weather application is executed for a predetermined period exceeds a predetermined number of times or whether the weather application is running as a function in the electronic device 201, when motion of the electronic device 201 is detected, and identifying the activity state of the user in a case that the number of times the weather application is executed for the predetermined period exceeds the predetermined number of times or the weather application is running as the function in the electronic device 201.

According to various example embodiments, the method for updating the weather information based on the activity state of the user of the electronic device 201 may further include identifying whether the activity state of the user is changed based on the at least one of the first sensor information received from the external electronic device or the second sensor information obtained through the sensor circuit 230 after updating the weather information, changing the update period of the weather information to a period corresponding to the changed activity state of the user when the activity state of the user is changed, and updating the weather information corresponding to the position information of the electronic device 201 when the changed period has elapsed from time the weather information was updated, and displaying at least one graphic object related to at least one of the position information, the weather information, or the changed activity state of the user on the touch screen display 240.

While the disclosure has been illustrated and described with reference to various example embodiments, it will be understood that the various example embodiments are intended to be illustrative, not limiting. It will be further understood by those of ordinary skill in the art that various changes in form and detail may be made without departing from the true spirit and full scope of the disclosure, including the appended claims and their equivalents. It will also be understood that any of the embodiment(s) described herein may be used in conjunction with any other embodiments) described herein.

What is claimed is:

1. An electronic device comprising:
a wireless communication circuit;
a positioning circuit;
a sensor;
a touch screen display;
memory, including one or more storage media, storing instructions; and
at least one processor, comprising processing circuitry, operatively connected to the wireless communication circuit, the positioning circuit, the sensor, and the touch screen display,
wherein the instructions, when executed by the at least one processor individually or collectively, cause the electronic device to:
receive position information of the electronic device at predetermined time intervals through the positioning circuit;
identify a distance moved by the electronic device during a specified time based on the position information received at the predetermined time intervals;
identify an activity state of a user of the electronic device based on the identified distance moved by the electronic device during the specified time;
determine a time period for obtaining weather information corresponding to the identified activity state;
when the determined time period arrives, identify a position of the electronic device using the positioning circuit and obtain, from an external electronic device, weather information corresponding to the identified position; and
display, on the touch screen display, at least one graphic object related to the obtained weather information.

2. The electronic device of claim 1, wherein the instructions, when executed individually or collectively by the at least one processor, cause the electronic device to display, on the touch screen display, at least one graphic object related to at least one the position or the activity state of the user,
wherein the activity state of the user is identified based on second sensor information received from an external electronic device and the second sensor information includes at least one of biometric information or health information, and
wherein the activity state of the user is identified based on first sensor information obtained through the sensor and the first sensor information includes at least one of a moving speed of the electronic device or a degree of tilting of the electronic device.

3. The electronic device of claim 2, wherein the identified activity state of the user includes one of a first state, a second state, or a third state,
wherein the first state is a state in which the user is moving in a vehicle,
wherein the second state is a state in which the user is moving on a bicycle,
wherein the third state is a state in which the user is running or walking, and
wherein the instructions, when executed individually or collectively by the at least one processor, cause the electronic device to:
identify, when the distance moved by the electronic device exceeds a first predetermined distance, the activity state to be the first state,
identify, when the distance moved by the electronic device is less than or equal to the first predetermined distance and exceeds a second predetermined distance, the activity state to be the second state, and
identify, when the distance moved by the electronic device is less than or equal to the second predetermined distance, the activity state to be the third state.

4. The electronic device of claim 3, wherein the instructions, when executed individually or collectively by the at least one processor, cause the electronic device to identify the activity state of the user based on at least one of information about a communication connection state with the vehicle, ambient noise information, schedule information, or access point (AP) information.

5. The electronic device of claim 4, wherein the instructions, when executed individually or collectively by the at least one processor, cause the electronic device to:
determine, when the identified activity state of the user is the first state, the time period to be a first period of time,
determine, when the identified activity state of the user is the second state, the time period to be a second period of time, and
determine, when the identified activity state of the user is the third state, the time period to be a third period of time,
wherein the second period of time is longer than the first period of time, and the third period of time is longer than the second period of time.

6. The electronic device of claim 4, wherein the instructions, when executed individually or collectively by the at least one processor, cause the electronic device to:
transmit raw data for the at least one of the first sensor information or the second sensor information to a server through the wireless communication circuit, receive a learning model learned through machine learning by artificial intelligence from the server, and identify the activity state of the user based on the received learning model, or transmit the raw data for the at least one of the first sensor information or the second sensor information to a server through the wireless communication circuit, receive the activity state of the user corresponding to the at least one of the first sensor information or the second sensor information from the server, and identify the activity state of the user based on the received activity state of the user.

7. The electronic device of claim 2, wherein the instructions, when executed individually or collectively by the at least one processor, cause the electronic device to:

accumulate and store identified activity states of the user and the at least one of the first sensor information or the second sensor information corresponding to the identified activity states of the user in the memory, learn the activity states of the user and the at least one of the first sensor information or the second sensor information corresponding to the activity state stored in the memory in an artificial intelligence scheme, and calculate confidence related to the identified activity state of the user based on a learned learning model.

8. The electronic device of claim 7, wherein the instructions, when executed individually or collectively by the at least one processor, cause the electronic device to:

identify whether the calculated confidence related to the identified activity state of the user exceeds a confidence value, and based on the calculated confidence related to the activity state of the user exceeding the confidence value, obtain, from the external electronic device, the weather information corresponding to the identified position when the determined time period arrives, determine a graphic object related to the identified activity state, and display, on the touch screen display, the determined graphic object related to the activity state of the user.

9. The electronic device of claim 8, wherein the instructions, when executed individually or collectively by the at least one processor, cause the electronic device to:

obtain the identified position, the graphic object related to the weather information, and the graphic object related to the activity state of the user, based on a first graphic object database (DB) including at least one first graphic object related to the activity state of the user, a second graphic object DB including at least one second graphic related to the position information of the electronic device, and a third graphic object DB including at least one third graphic object related to the weather information, which are stored in the memory or server, and display, on the touch screen display, the identified position, the graphic object related to the weather information, and the graphic object related to the activity state of the user.

10. The electronic device of claim 1, wherein the instructions, when executed individually or collectively by the at least one processor, cause the electronic device to:

identify whether a number of times a weather application is executed for a predetermined period exceeds a predetermined number of times or whether the weather application is running as a function in the electronic device, and identify the activity state of the user based on the number of times the weather application is executed for the predetermined period exceeding the predetermined number of times or based on the weather application running as the function in the electronic device.

11. The electronic device of claim 2, wherein the instructions, when executed individually or collectively by the at least one processor, cause the electronic device to:

identify whether the activity state of the user changes based on the at least one of the distance moved by the electronic device, the moving speed of the electronic device, the degree of tilting of the electronic device, biometric information, or health information, after obtaining the weather information, change the time period to a time period corresponding to the changed activity state when the activity state of the user is changed.

12. A method comprising:

receiving position information of an electronic device at predetermined time intervals through a positioning circuit;

identifying a distance moved by the electronic device during a specified time based on the position information received at the predetermined time intervals;

identifying an activity state of a user of an electronic device based on the identified distance moved by the electronic device during the specified time;

determining a time period for obtaining weather information corresponding to the identified activity state;

when the determined time period arrives, identify a position of the electronic device using a positioning circuit and obtain, from an external electronic device, weather information corresponding to the identified position; and displaying, on a touch screen display, at least one graphic object related to the obtained weather information.

13. The method of claim 12, further comprising:

displaying, on the touch screen display, at least one graphic object related to at least one the position or the activity state of the user, wherein the activity state of the user is identified based on second sensor information received from an external electronic device and the second sensor information comprises at least one of biometric information or health information, and wherein the activity state of the user is identified based on first sensor information obtained through a sensor and the first sensor information comprises at least one of a moving speed of the electronic device or, a degree of tilting of the electronic device.

14. The method of claim 13, wherein the identified activity state of the user comprises one of a first state, a second state, and a third state, wherein the first state is a state in which the user is moving in a vehicle, wherein the second state is a state in which the user is moving on a bicycle, wherein the third state is a state in which the user is running or walking, and wherein the identifying the activity state of the user comprises:

identifying, when the distance moved by the electronic device exceeds a first predetermined distance, the activity state to be the first state, identifying, when the distance moved by the electronic device is less than or equal to the first predetermined distance and exceeds a second predetermined distance, the activity state to be the second state, and identifying, when the distance moved by the electronic device is less than or equal to the second predetermined distance, the activity state to be the third state.

15. The method of claim 14, wherein the determined time period comprises a first time period when the identified activity state of the user is the first state, a second time period when the identified activity state of the user is the second state, and a third time period when the identified activity state of the user is the third state, and wherein the second time period is longer than the first time period, and the third time period is longer than the second time period.

16. The method of claim 12, wherein the identifying the activity state of the user comprises:

transmitting raw data for the at least one of the first sensor information or the second sensor information to a server through a wireless communication circuit, receiving a learning model learned through machine learning by artificial intelligence from the server, and identifying the activity state of the user based on the received learning model; or transmitting the raw data for the at least one of the first sensor information or the second sensor information to a server through the wireless communication circuit, receiving the activity state of the user corresponding to the at least one of the first sensor information or the second sensor information from the server, and identifying the activity state of the user based on the received activity state of the user.

17. The method of claim 12, further comprising:

accumulating and storing identified activity states of the user and the at least one of the first sensor information or the second sensor information corresponding to the identified activity states of the user;

learning the activity states of the user and the at least one of the first sensor information or the second sensor information corresponding to the activity state stored in a memory in an artificial intelligence scheme; and calculating confidence related to the identified activity state of the user based on the learned learning model.

18. The method of claim 17, wherein the displaying the at least one graphic object on the touch screen display comprises:

identifying whether the calculated confidence related to the identified activity state of the user exceeds a confidence value; and based on the calculated confidence related to the activity state of the user exceeding the confidence value, obtaining, from the external electronic device, the weather information corresponding to the identified position when the determined time period arrives;

determining a graphic object related to the activity state of the user; and displaying, on the touch screen display, the determined graphic object related to the identified activity state.

19. The method of claim 12, further comprising:

identifying whether a number of times a weather application is executed for a predetermined period exceeds a predetermined number of times or whether the weather application is running as a function in the electronic device, when motion of the electronic device is detected; and identifying the activity state of the user based on the number of times the weather application is executed for the predetermined period exceeding the predetermined number of times or based on the weather application running as the function in the electronic device.

20. The method of claim 12, further comprising:

identifying whether the activity state of the user changes based on the at least one of the distance moved by the electronic device, the moving speed of the electronic device, a degree of tilting of the electronic device, biometric information, or health information, after obtaining the weather information; and changing the time period to a time period corresponding to the changed activity state when the activity state of the user is changed.

\* \* \* \* \*